(12) United States Patent
Tamura

(10) Patent No.: US 8,256,823 B2
(45) Date of Patent: Sep. 4, 2012

(54) TRIM AND CORE THEREOF, AND METHOD AND APPARATUS FOR MANUFACTURING TRIM AND CORE

(75) Inventor: Tatsuya Tamura, Kanagawa (JP)

(73) Assignee: Tokai Kogyo Co., Ltd., Obu-shi (JP)

( * ) Notice: Subject to any disclaimer, the term of this patent is extended or adjusted under 35 U.S.C. 154(b) by 194 days.

(21) Appl. No.: 12/531,274

(22) PCT Filed: Jan. 30, 2008

(86) PCT No.: PCT/JP2008/051346
§ 371 (c)(1),
(2), (4) Date: Oct. 28, 2009

(87) PCT Pub. No.: WO2008/111331
PCT Pub. Date: Sep. 18, 2008

(65) Prior Publication Data
US 2010/0086732 A1    Apr. 8, 2010

(30) Foreign Application Priority Data

Mar. 14, 2007 (JP) ................................. 2007-064265
Apr. 3, 2007 (JP) ................................. 2007-097755
Apr. 18, 2007 (JP) ................................. 2007-108778

(51) Int. Cl.
B60J 10/00 (2006.01)
B60J 10/08 (2006.01)
(52) U.S. Cl. .................... 296/93; 296/146.9; 296/146.2; 49/490.1
(58) Field of Classification Search ............... 296/146.2, 296/146.9, 93; 49/490.1
See application file for complete search history.

(56) References Cited

U.S. PATENT DOCUMENTS 4,676,856 A * 6/1987 Shigeki et al. ................ 156/201
4,970,101 A * 11/1990 Keys .............................. 428/110
(Continued)

FOREIGN PATENT DOCUMENTS
CN        1486893 A        4/2004
(Continued)

OTHER PUBLICATIONS

Chinese Office Action dated Oct. 11, 2010, issued in corresponding Chinese Patent Application No. 200880003463.6. (with Japanese Translation).

(Continued)

*Primary Examiner* — Dennis Pedder
*Assistant Examiner* — Jason S Daniels
(74) *Attorney, Agent, or Firm* — Westerman, Hattori, Daniels & Adrian, LLP

(57) ABSTRACT

Core (16) in weatherstrip (13) is obtained by linking multiple core pieces (22) at given intervals to provide separation spaces (24) between individual core pieces (22). The interior of the separation spaces (24) is filled with filler polymer material (P2) having a thickness substantially equal to that of the core pieces (22). The whole surface of the core (16) is coated with the filler polymer material (P2). Accordingly, the thicknesses of trim polymer material (P1) at the area covering the core pieces (22) and at the area covering the separation spaces (24) are made substantially identical with each other, thereby attaining substantially zeroing of the variation of molding shrinkage along the thickness direction of the trim polymer material (P1).

15 Claims, 20 Drawing Sheets

U.S. PATENT DOCUMENTS

| | | |
|---|---|---|
| 7,257,924 B2 * | 8/2007 | Kounobu et al. ............. 49/490.1 |
| 2004/0043188 A1 | 3/2004 | Tsujiguchi |
| 2005/0072052 A1 | 4/2005 | Kounobu et al. |

FOREIGN PATENT DOCUMENTS

| | | |
|---|---|---|
| CN | 1605451 A | 4/2005 |
| DE | 3835211 A1 | 4/1990 |
| JP | 61-229636 A | 10/1986 |
| JP | 3-15768 U | 2/1991 |
| JP | 09-076835 A | 3/1997 |
| JP | 2001-009889 A | 1/2001 |
| JP | 2002-103411 A | 4/2002 |
| JP | 2004-026089 A | 1/2004 |
| JP | 2004-314809 A | 11/2004 |
| JP | 2005-132343 A | 5/2005 |

OTHER PUBLICATIONS

Notification of Translation of Translation of the International Preliminary Report on Patentability (Forms PCT/IB/338) of International Application No. PCT/JP2008/051346 mailed Dec. 10, 2009 with Form PCT/IPEA/409.

International Search Report of PCT/JP2008/051346, Mailing Date of May 13, 2008.

* cited by examiner

A-A SECTION

B-B SECTION

C-C SECTION

D-D SECTION

TRIM AND CORE THEREOF, AND METHOD AND APPARATUS FOR MANUFACTURING TRIM AND CORE

TECHNICAL FIELD

The present invention relates to a core of a long trim, the core being embedded in and integrated with the trim, and to a method and an apparatus for manufacturing the core. The present invention also relates to a long trim having a core embedded in and integrated with the trim, and to a method and an apparatus for manufacturing the trim.

BACKGROUND ART

In general, a long trim is attached along a flange at an opening edge of a door or a window of a vehicle such as an automobile. The trim is made by extruding polymer material such as rubber or thermoplastic synthetic resin (including thermoplastic elastomer) into a shape having a mounting portion with a substantially U-shaped cross section. The trim is fixed to the flange as the substantially U-shaped mounting portion nips the flange. The mounting portion of the trim can be reinforced with a core and stably fixed to the flange at the opening edge by embedding a long reinforcing core (for example, a metal plate such as a cold rolled steel plate) having a substantially U-shaped cross section in the mounting portion and integrating the core with the mounting portion.

A flange at an opening edge of a door or a window of a vehicle is two-dimensionally or three-dimensionally curved in a longitudinal direction. Thus, a trim, which has been formed by extrusion so as to be substantially linear, is bent so that the trim fits the curve of the flange at the opening edge and attached to the flange. Therefore, as a core to be embedded in a trim, a partially punched core (also referred to as a fish-bone core or a keel core), which has spaces at a predetermined interval in a longitudinal direction, is used so that the core can be flexibly bent to follow the bend of the trim.

However, when a trim with an embedded core is made by covering the partially punched core with a trim polymer material, recessed marks (also referred to as keel marks) may occur on a surface of the trim at a predetermined interval in the longitudinal direction, which may deteriorate the appearance of the trim. The recessed marks occur more conspicuously when the thickness of the core is increased and the ratio of the thickness of the core to the thickness of a trim polymer material covering the core is increased so as to increase the retention strength of the trim.

Presumably, the recessed marks occur for the following reason. The spaces, which are formed in the partially punched core at a predetermined interval, usually have a width in the longitudinal direction as narrow as about 1 mm. Thus, when flowing the trim polymer material into the spaces, the flow resistance is large, which makes it difficult to flow a sufficient amount of polymer material into the spaces. Moreover, regarding the trim polymer material covering the core, the thickness of the polymer material at portions corresponding to the spaces (portions where the core is absent) is larger than the thickness at portions where the core is present, which leads to larger mold shrinkage of the polymer material. Therefore, the recessed marks presumably occur on the surface of the trim in the portions corresponding to the spaces of the core (portions where the core is absent).

In order to address the problem that the appearance deteriorates due to occurrence of the recessed marks, Patent Document 1 (Japanese Unexamined Patent Application Publication No. 9-76835) describes a trim in which a plurality of ribs extending in a longitudinal direction are formed in portions of the trim, the portions covering slits (spaces) of a core, and the ribs are covered with sponge rubber, so that recessed marks occurring on the trim with an embedded core are made inconspicuous.

[Patent Document 1] Japanese Unexamined Patent Application Publication No. 9-76835 (p. 2, etc.)

DISCLOSURE OF INVENTION

Problems to be Solved by the Invention

However, the technique of Patent Document 1 is a technique for making recessed marks that occur on a trim with an embedded core inconspicuous and cannot prevent the recessed marks from occurring.

Alternatively, in order to suppress the occurrence of recessed marks, the thickness of trim polymer material covering a core may be increased (typically to a thickness that is equal to or greater than three times the thickness of the core) so that the difference between the thickness of the polymer material at portions corresponding to spaces of the core (portions where core is absent) and the thickness of the polymer material at portions where the core is present is decreased, whereby the difference in mold shrinkage of the polymer material is decreased. By this method, however, the amount of the trim polymer material covering the core is increased, which leads to a disadvantage that the weight and cost of the trim are increased.

The present invention is made in view of such a background. Therefore, the object of the present invention is to prevent recessed marks from occurring on a surface of a trim with an embedded core while retaining predetermined functions of the trim. Moreover, since it is not necessary that the thickness of a trim polymer material covering a core be large, a demand for widening the selection range of a material for a trim can be satisfied.

Means for Solving the Problems

In order to achieve the object, according to the present invention, a core of a trim is made of a long and substantially strip-shaped core material; the core includes a plurality of core pieces disposed at a predetermined interval in a longitudinal direction, connection portions connecting the plurality of core pieces to each other in the longitudinal direction, and separation spaces disposed between adjacent core pieces; and the core is embedded in and integrated with the trim by being covered with a trim polymer material when the trim having a large length is formed, wherein a filler polymer material is filled into the separation spaces and held between the adjacent core pieces, the filler polymer material being capable of chemically joined to the trim polymer material and having a lower hardness and being more flexible than the core material to such an extent as not to prevent the adjacent core pieces from being moved closer to or away from each other, so that, when forming the trim, a difference in mold shrinkage of the trim polymer material in the thickness direction between portions of the trim polymer material covering the core pieces and the connection portions and portions of the trim polymer material covering the separation spaces filled with the filler polymer material is decreased or eliminated.

That is, by filling the separation spaces of the core with the filler polymer material, the difference in thickness between the portions of the trim polymer material covering the core pieces and the connection portions and the portions of the trim polymer material covering the separation spaces filled with the filler polymer material can be reduced or eliminated when forming the trim. Thus, the difference in mold shrinkage of the trim polymer material in the thickness direction can be reduced or eliminated. Therefore, recessed marks are prevented from occurring on the surface of the trim while retaining predetermined functions of the trim.

Moreover, it is not necessary that the thickness of the trim polymer material covering the core be large. Even when the thickness of the trim polymer material covering the core is small, recessed marks are prevented from occurring on the surface of the trim. Thus, the amount of the trim polymer material can be reduced, so that a demand for reducing the weight and cost of the trim is satisfied.

As the filler polymer material, inexpensive material (for example, recycled material or waste material), which may be inferior to new material in terms of strength and performance, can be used at low cost, so that the material can be effectively utilized and the cost can be reduced.

Moreover, since the separation spaces are filled with the filler polymer material, it is unlikely that air gaps (small spaces) are left between the core pieces. Thus, the surface of the trim is prevented from being deformed due to expansion and contraction of the air gaps, which may be caused by a change in temperature in a process of manufacturing the trim (for example, a change in temperature when the trim polymer material is in a heat curing process or a cool solidifying process) or by a change in temperature after the trim has been manufactured (for example, a change in temperature after the trim is attached to a vehicle).

In this case, the core pieces, the connection portions, and the separation spaces may be formed by removing portions of the core material corresponding to the separation spaces from the core material while leaving portions to become the core pieces and portions to become the connection portions. Alternatively, the core pieces, the connection portions, and the separation spaces may be formed by, in a state in which a plurality of slits are formed at a predetermined interval in the longitudinal direction in such a manner that the slits extend in a width direction so as to leave the portions of the core material to become the connection portions, rolling and extending the portions of the core material to become the connection portions in the longitudinal direction and enlarging the slits in the longitudinal direction. In either case, a core having separation spaces formed therein can be easily manufactured using a known manufacturing method or a manufacturing apparatus.

The separation spaces disposed between adjacent core pieces may have substantially the same shape, and each of the separation spaces may be filled with substantially the same amount of the filler polymer material. Thus, a stable function of the core is secured along the entire length in the longitudinal direction.

The core material may be a metal plate that is one of a cold rolled steel plate, a spring steel plate, a high-tensile steel plate, a stainless steel plate, and a non-ferrous metal plate. Such metal plates are readily available. Alternatively, the core material may be a plate-shaped hard thermoplastic synthetic resin strip. If a metal core is embedded in a trim, it is necessary to separated the metal core from the trim when recycling the trim after use. However, if a resin core is embedded in a trim, it is not necessary to separate the core, which facilitates recycling of the trim after use.

In this case, the thickness of the core material may be equal to or larger than 0.15 mm and equal to or smaller than 1.0 mm. Thus, the trim can be appropriately reinforced by embedding the core, without losing and favorably assuring bendability of the trim.

The filler polymer material may be thermoplastic synthetic resin (including thermoplastic elastomer) or rubber. Thus, the filler polymer material can be easily filled into the separation spaces.

The filler polymer material may be filled into the separation spaces such that the thickness of the filler polymer material is substantially the same as the thickness of the core pieces. Thus, the trim polymer material can be made to have substantially the same thickness at portions covering the core pieces and at portions covering the separation spaces filled with the filler polymer material, whereby the difference in mold shrinkage of the trim polymer material in the thickness direction can be substantially eliminated. Thus, recessed marks are prevented from occurring on the surfaces of the trim. Moreover, when the core passes through a die for forming a trim, the core can smoothly pass through the die without being snagged on the die and without abrading the inside of the die.

The entire surface of the core pieces and the connection portions may be covered with the filler polymer material, and the filler polymer material covering the core pieces and the connection portions may have a thickness that does not exceed the thicknesses of the core pieces and the connection portions and may be continuous with the filler polymer material filled into the separation spaces. Thus, portions of the filler polymer material filled into the separation spaces can be connected to each other using the filler polymer material covering the core pieces, so that the filler polymer material filled into the separation spaces can be stably held by the core.

If the portions to become the connection portions are rolled in the longitudinal direction, the rolled portions become thinner than portions that are not rolled. The rolled portions may be covered with the filler polymer material, and the filler polymer material covering the rolled portions may be continuous with the filler polymer material filled into the separation spaces. Also in this manner, the portions of the filler polymer material filled into the separation spaces can be connected to each other using the filler polymer material covering the core pieces, so that the filler polymer material filled into the separation spaces can be stably held by the core.

The filler polymer material may be more flexible than the trim polymer material. Thus, the core is prevented from becoming hard to bend due to the filler polymer material filled into the separation spaces, whereby bendability of the core can be secured.

When manufacturing the trim of the present invention, a core including core pieces, connection portions, and separation spaces may be obtained, and a polymer material filling step may be performed so as to fill the filler polymer material into the separation spaces in a flowable state. Alternatively, a separation space forming step for forming core pieces and separation spaces in a core material and a polymer material filling step for filling a filler polymer material when it is in a flowable state into the separation spaces may be performed. By either method, a core of a trim of the present invention can be easily manufactured.

In this case, the core material on at least a surface of which the filler polymer material in sheet is continuously layered in the longitudinal direction may be obtained; the core pieces, the connection portions, and the separation spaces may be formed in the core material on which the filler polymer material in sheet form is layered; and the filler polymer material in sheet form may be flowed from the position of the core pieces and filled into the separation spaces by applying a compressive force in the thickness direction to the filler polymer material in sheet form. Also in this manner, a core of a trim of the present invention can be easily manufactured.

Alternatively, a layering step for continuously layering the filler polymer material in sheet form on at least a surface of the core material in the longitudinal direction may be performed; the core pieces, the connection portions, and the separation spaces may be formed in the core material on which the filler polymer material in sheet form is layered; and the filler polymer material in sheet form may be flowed from the position of the core pieces and filled into the separation spaces by applying a compressive force in the thickness direction to the filler polymer material in sheet form. Also in this manner, a core of a trim of the present invention can be manufactured.

A core having separation spaces formed therein may be continuously introduced into an extrusion die for extruding the filler polymer material so as to fill, in the extrusion die, the filler polymer material into the separation spaces. Thus, the filler polymer material can be efficiently filled into the separation spaces.

The filler polymer material may be filled into the separation spaces during a period that the core having the separation spaces formed therein is substantially plate-shaped. Thus, the filler polymer material can be more easily filled into the separation spaces than the case in which the filler polymer material is filled into the separation spaces of the core after the core has been bent to be substantially U-shaped.

Alternatively, the filler polymer material may be filled into the separation spaces after the core having the separation spaces formed therein has been formed in a predetermined cross-sectional shape. Thus, the filler polymer material is filled into the core after the core has been formed (by bending, for example) to have a final cross-sectional shape or an intermediate cross-sectional shape similar to the final cross-sectional shape, so that the filler polymer material is prevented from being displaced or removed from the separation spaces when forming the core (by bending, for example).

When filling the filler polymer material into the separation spaces, surfaces of the core pieces and the connection portions may be covered with the filler polymer material, and, during a period that the filler polymer material is flowable, the filler polymer material on the surfaces of the core pieces and the connection portions is flowed in the longitudinal and width directions and additionally filled into the separation spaces. Thus, even if the filler polymer material is not sufficiently filled into the separation spaces by the initial filling, the filler polymer material can be sufficiently filled into the separation spaces by the additional filling.

The filler polymer material may be cured or solidified after the polymer material filling step. Thus, the filler polymer material can be stably held between adjacent core pieces.

An apparatus for manufacturing a core of a trim of the present invention may, by obtaining a core including core pieces, connection portions, and separation spaces, continuously feed the core having separation spaces formed therein in the longitudinal direction using core feeding means, and may fill the filler polymer material into the separation spaces using polymer material filling means. Alternatively, a core material may be continuously fed in the longitudinal direction using core material feeding means; core pieces, connection portions, and separation spaces may be formed in the core material using separation space forming means; and a filler polymer material may be filled into the separation spaces using polymer material filling means. By using either apparatus, a core of a trim of the present invention can be stably and easily manufactured.

In this case, the separation space forming means may be a press machine including a press punching die for removing portions of the core material corresponding to the separation spaces from the core material while leaving portions to become the core pieces and portions to become the connection portions. Alternatively, the separation space forming means may be a rolling roller machine that, in a state in which a plurality of slits are formed at a predetermined interval in the longitudinal direction in such a manner that the slits extend in a width direction so as to leave portions of the core material to become the connection portions, rolls and extends the portions to become the connection portions in the longitudinal direction and enlarges the slits in the longitudinal direction. In either case, the core pieces, the connection portions, and the separation spaces can be efficiently formed in the core material.

The polymer material filling means may be an extrusion machine including an extrusion die for extruding the filler polymer material. The filler polymer material can be efficiently filled into the separation spaces in the extrusion die for extruding the filler polymer material by continuously introducing the core having separation spaces formed therein into the extrusion die in the longitudinal direction.

A trim according to the present invention has a large length and includes a core for reinforcement, the core being made of a long and substantially strip-shaped core material, the core including a plurality of core pieces disposed at a predetermined interval in a longitudinal direction, connection portions connecting the plurality of core pieces to each other in the longitudinal direction at least before being embedded in the trim, and separation spaces disposed between adjacent core pieces, the core being embedded in and integrated with the trim by being covered with a trim polymer material, wherein a filler polymer material is filled into the separation spaces and held between the adjacent core pieces, the filler polymer material being capable of chemically joined to the trim polymer material and having a lower hardness and being more flexible than the core material to such an extent as not to prevent the adjacent core pieces from being moved closer to or away from each other, so that the trim polymer material and the polymer filler material are integrally joined to each other at a contact portion and a difference in mold shrinkage of the trim polymer material in the thickness direction between portions of trim polymer material covering the core pieces and the connection portions and portions of the trim polymer material covering the separation spaces filled with the filler polymer material is decreased or eliminated.

In this case, the trim may include a mounting portion having a substantially U-shaped cross section, and the trim may be fixed to an object by placing the substantially U-shaped mounting portion on the object so as to nip the object with the mounting portion from both sides. Thus, The trim can be stably fixed to the object.

A holding lip may be integrally formed with an inner peripheral surface of the substantially U-shaped mounting portion, the holding lip protruding inward and being elastic. Thus, when the substantially U-shaped mounting portion is placed on the object, the holding lip can be elastically deformed and made to contact the object. Thus, the trim can be more stably fixed to the object due to elastic repulsion of the holding lip.

The present invention may be applied to a trim in which the core pieces are connected with each other in the longitudinal direction through the connection portions even after the core has been embedded in the trim. Alternatively, the core pieces of the core may be separated in the longitudinal direction by breaking the connection portions after the core has been embedded in the trim.

Regarding the combination of the trim polymer material and the filler polymer material, both trim polymer material and the filler polymer material may be elastic rubber mainly composed of EPDM (ethylene-propylene-dien rubber) and the trim polymer material and the filler polymer material are joined to each other at a contact portion by vulcanized adhesion. Thus, the trim polymer material and the filler polymer material can be solidly joined and integrated with each other by vulcanized adhesion of rubber.

Alternatively, the trim polymer material may be elastic rubber mainly composed of ethylene-propylene-dien rubber, the filler polymer material may be elastically deformable olefin system thermoplastic synthetic resin, and the trim polymer material and the filler polymer material may be joined to each other at a contact portion by thermobonding. Thus, the trim polymer material and the filler polymer material can be solidly joined and integrated with each other by thermobonding between rubber and resin.

Moreover, both the trim polymer material and the filler polymer material may be elastically deformable olefin system thermoplastic synthetic resin, and the trim polymer material and the filler polymer material may be joined to each other at a contact portion by thermobonding. Thus, the trim polymer material and the filler polymer material can be solidly joined and integrated with each other by thermobonding of resin.

When manufacturing the trim of the present invention, a core having the separation spaces filled with a filler polymer material is used; an extrusion step is performed, the extrusion step for embedding the core in a trim body by covering the core with a trim polymer material by extruding the trim body by continuously supplying the core to an extrusion die for forming the trim body into a predetermined cross-sectional shape and continuously supplying the trim polymer material to the extrusion die in a flowable state; a treatment step is performed after the extrusion step, the treatment step for curing or solidifying the trim body formed from the trim polymer material; and in the extrusion step and/or the treatment step, the trim polymer material and the filler polymer material are joined and integrated with each other at a contact portion. Thus, a trim of the present invention can be easily manufactured.

In this case, if the trim polymer material is rubber, the trim body may be heated, vulcanized, and cured in the treatment step. Thus, a trim body (unvulcanized rubber) after extrusion can be quickly vulcanized and cured.

Alternatively, if the trim polymer material is thermoplastic synthetic resin, the trim body may be cooled and solidified in the treatment step. Thus, the trim body (unsolidified resin) after extrusion can be rapidly cooled and solidified.

After the treatment step, a final forming step may be performed, the final forming step for forming the trim body into a predetermined final cross-sectional shape together with the core embedded in the trim body. Thus, a trim having a final cross-sectional shape can be efficiently manufactured.

An apparatus for manufacturing a trim according to the present invention may, by obtaining a core including core pieces, connection portions, and separation spaces, continuously feed the core having separation spaces therein in the longitudinal direction using core feeding means; fill a filler polymer material in the separation spaces of the core using polymer material filling means; embed the core in the trim body by extruding a trim body with a trim polymer material using extrusion molding means; and cure or solidify the trim body using treatment means.

Alternatively, an apparatus may continuously feed the core material in the longitudinal direction using core material feeding means; form the core including core pieces, connection portions, and separation spaces from the core material using separation space forming means; fill a filler polymer material into the separation spaces using polymer material filling means; embed the core in the trim body by extruding the trim body using extrusion molding means; and cure or solidify the trim body using treatment means. By using either apparatus, a trim of the present invention can be easily manufactured.

The apparatus may further include core forming means for forming the core having separation spaces filled with the filler polymer material into a predetermined cross-sectional shape. Thus, after the core having separation spaces filled with the filler polymer material has been formed to have a predetermined cross-sectional shape, the trim body can be efficiently formed.

If the trim polymer material is rubber, the treatment means may include a heating machine for heating, vulcanizing, and curing the trim body. Thus, the trim body after extrusion (unvulcanized rubber) can be rapidly vulcanized and cured.

On the other hand, if the trim polymer material is thermoplastic synthetic resin (including thermoplastic elastomer), the treatment means may include a cooling machine for cooling and solidifying the trim body. Thus, the trim body after extrusion (unsolidified resin) can be rapidly cooled and solidified.

The apparatus may further include final forming means for forming the trim body into a predetermined final cross-sectional shape together with the core embedded in the trim body after the trim body has been cured or solidified by the treatment means. Thus, a trim having a final cross-sectional shape can be efficiently manufactured.

Figure 1:
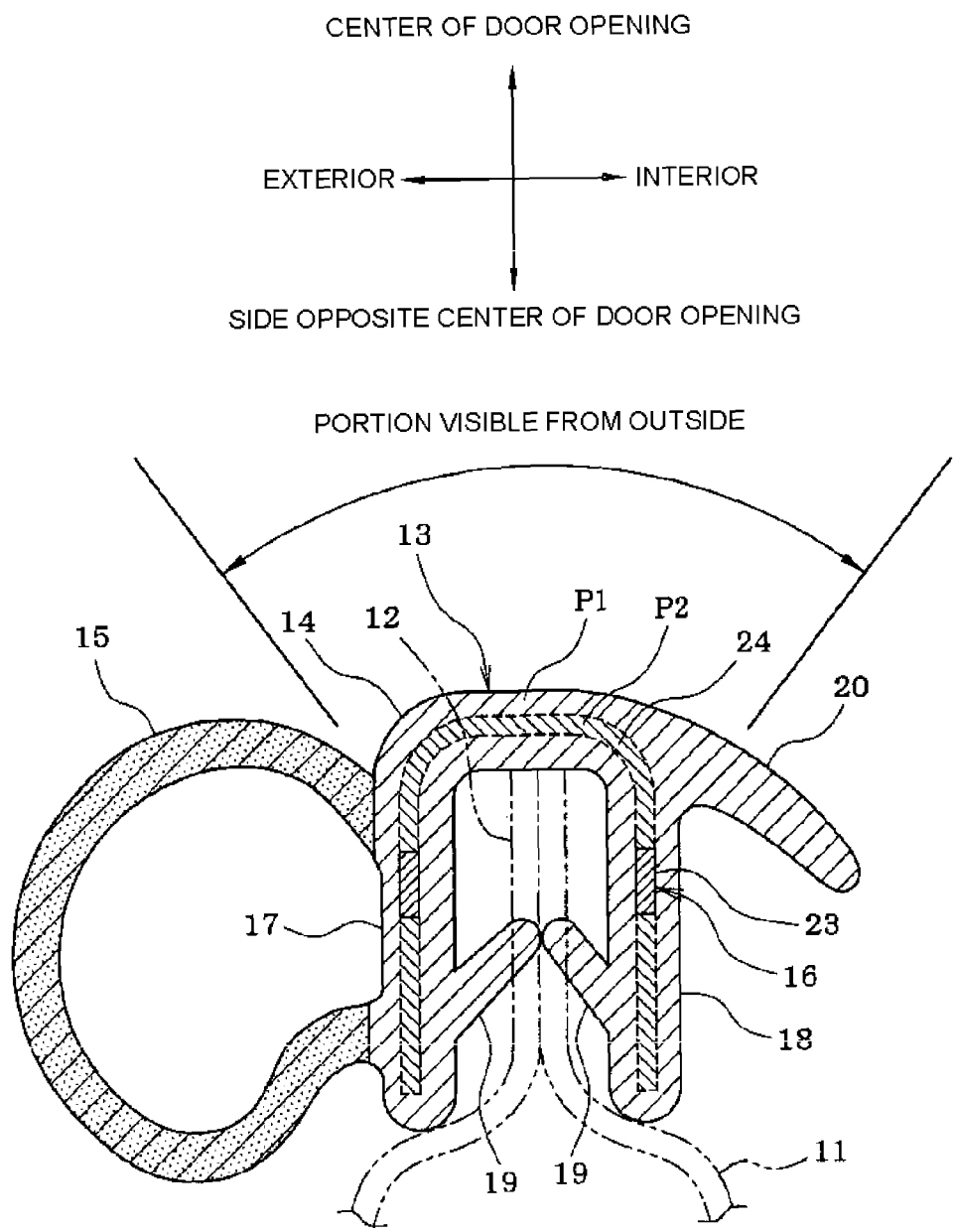
FIG. 1 is a sectional view of a weatherstrip according to a first embodiment of the present invention.

REFERENCE NUMERALS 13 weatherstrip (trim)
16 core
21 core material
22 core piece
23 connection portion
24 separation space
28 feeding roller (core material feeding means)
29 press machine (separation space forming means)
30 press punching die
34 feeding roller (core feeding means)
38 extrusion machine (polymer material filling means)
39 extrusion die
40 leveling machine (additional filling means)
43 trimming machine (trimming means)
53 core cold roll forming machine (core forming means)
58 extrusion machine (extrusion molding means)
59 extrusion die
62 cure treatment machine (treatment means)
63,64 heating machine
65 cooling machine (treatment means)
66 trim cold roll forming machine (final forming means)
70 cut-off machine
72 press roller machine (polymer material filling means)
78 leveling machine (additional filling means)
84 core material
86 slit
87 core piece
88 connection portion
89 separation space
90 core
91 rolling roller machine (separation space forming means)
P1 trim polymer material
P2 filler polymer material

BEST MODES FOR CARRYING OUT THE INVENTION

Hereinafter, embodiments of best modes for carrying out the present invention are described.

First Embodiment

Referring to FIGS. 1 to 19, a first embodiment of the present invention is described. As shown in FIG. 1, a weatherstrip 13 (trim) having a large length is attached to a flange 12 and extends along the flange 12 on an edge of a body panel 11 in an opening of a door located on a side, at the rear, or on the roof of a vehicle. The weatherstrip 13 is made by extruding a trim polymer material P1 made of thermoplastic synthetic resin (including thermoplastic elastomer), rubber, or the like. The weatherstrip 13 includes a mounting portion 14 having a substantially U-shaped section and a tubular hollow sealing portion 15 made of a sponge material, which are integrally formed. In the mounting portion 14, a core 16 having a large length, which is described below, is embedded by insert molding. As the trim polymer material P1 forming the weatherstrip 13, for example, an elastic rubber, having a durometer hardness of HDA 50-80 (preferably HDA 60-70) according to JIS K7215 and mainly composed of EPDM (ethylene-propylene-dien rubber), or an elastically deformable olefin system thermoplastic synthetic resin is used.

Holding lips 19 are integrally formed with inner peripheral surfaces of an exterior side wall 17 and an interior side wall 18 of the mounting portion 14, respectively. The holding lips 19 protrude inward. When the mounting portion 14 of the weatherstrip 13 is placed to cover the flange 12 of the body panel 11 on an edge of a door opening, the holding lips 19 are elastically deformed and nip the flange 12 from both the interior and exterior sides, so that the weatherstrip 13 is attached to the flange 12. Thus, the mounting portion 14 of the weatherstrip 13 nips the flange 12 from both sides, so that the weatherstrip 13 can be stably fixed to the flange 12. At this time, the holding lips 19 are elastically deformed and contact the flange 12, so that the weatherstrip 13 can be more stably fixed to the flange 12 due to elastic repulsion of the holding lips 19.

Moreover, a concealing lip 20, which protrudes to the interior side, is integrally formed on an outer peripheral surface of the interior side wall 18 of the mounting portion 14. When the weatherstrip 13 is attached to the flange 12, an end of an interior member (not shown) is inserted between the concealing lip 20 and the mounting portion 14 (the interior side wall 18) and covered therewith.

When forming the weatherstrip 13 by extrusion, the core 16 for reinforcement is covered with the trim polymer material P1 so that the core 16 is embedded in and integrated with the mounting portion 14, whereby the mounting portion 14 is reinforced with the core 16 and the mounting portion 14 can be stably fixed to the flange 12.

The flange 12 at an edge of a door opening of the body panel 11 is two-dimensionally or three-dimensionally curved (or twisted) in a longitudinal direction, and the weatherstrip 13, which has been formed by extrusion so as to be substantially linear, is bent so as to fit the curve of the flange 12 and is attached to the flange 12. Therefore, the core 16 to be embedded in the weatherstrip 13 has separation spaces 24 (see FIG. 2), which are described below, at a predetermined interval in a longitudinal direction so that the core 16 can be flexibly bent to follow the bend of the weatherstrip 13.

Next, referring to FIGS. 2 to 8, the structure of the core 16 to be embedded in the weatherstrip 13 is described. In FIGS. 4 to 8, for convenience of description, members such as the core 16 and a filler polymer material P2 are exaggerated and enlarged in the thickness direction.

As shown in FIGS. 2 to 5, the core 16 is made by press punching a core material 21, which is long and substantially strip-shaped. The core 16 includes core pieces 22 arranged in a longitudinal direction at a predetermined interval, connection portions 23 integrally formed with the core pieces 22 and connecting the core pieces 22 to each other in the longitudinal direction, and the separation spaces 24 disposed between adjacent core pieces 22. In the first embodiment, the connection portions 23 connecting the core pieces 22 to each other are provided in two rows, and the separation spaces 24 between adjacent core pieces 22 are divided into three regions by the two connection portions 23. The connection portions 23 may be provided in one row or in three or more rows.

In order that the weatherstrip 13 (the mounting portion 14) with the embedded core 16 may be appropriately reinforced while assuring bendability of the weatherstrip 13, a metal plate is used as the core material 21 for the core 16. The metal plate, for example, is made of cold rolled steel, spring steel, high-tensile steel, stainless steel, aluminum alloy, or non-ferrous metal, and has a thickness (t) in the range of 0.15 mm to 1.0 mm (for example, for a weatherstrip of an ordinary passenger car, preferably having a width in the range of 20 to 60 mm and a thickness in the range of 0.3 to 0.6 mm). Such metal plates are readily available. Each of the core pieces 22 arranged in the longitudinal direction of the core 16 has substantially the same shape and has a length in the longitudinal direction of the core in the range of, for example, 1 to 5 mm. Each of the separation spaces 24 arranged in the longitudinal direction of the core 16 has substantially the same shape and has a length in the longitudinal direction of the core 16 in the range of, for example, 0.5 to 5 mm (preferably in the range of 1.0 to 2 mm). Both ends of each of the core pieces 22 in the width direction of the core 16 are chamfered into a semicircle, or the corners of the both ends are chamfered with a predetermined angle (for example, 45°), so as to prevent the ends of the core pieces 22 from breaking through the weatherstrip 13 and being exposed to the outside.

Figure 6:
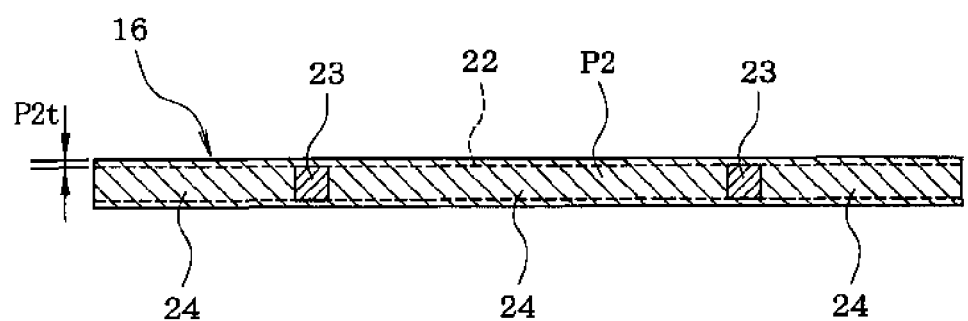
FIG. 6 is a cross-sectional view of a core of the first embodiment after being filled with a polymer material.
Figure 7:
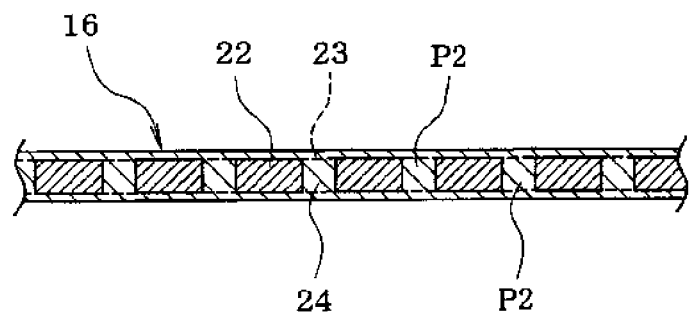
FIG. 7 is a longitudinal sectional view of a core of the first embodiment after being filled with a polymer material.

As shown in FIGS. 6 and 7, each of the separation spaces 24 of the core 16 is filled with a filler polymer material P2 such as thermoplastic synthetic resin (including thermoplastic elastomer) or rubber in such a manner that the filler polymer material P2 has substantially the same thickness as the core pieces 22, so that the filler polymer material P2 is held between adjacent core pieces 22. Moreover, the entire surface on the front and back sides of the core 16 including the core pieces 22 and the connection portions 23 (the outer surface side and the inner surface side of the weatherstrip 13) is covered with the filler polymer material P2. This filler polymer material P2 is continuous with the filler polymer material P2 filled into the separation spaces 24, and the filler polymer material P2 covering the core pieces 22 has a thickness ($P2t$) that does not exceed the thickness of the core pieces 22 ($P2t \leq t$). Thus, portions of the filler polymer material P2 filled into the separation spaces 24 are connected to each other with the filler polymer material P2 covering the core pieces 22 and the connection portions 23, so that the filler polymer material P2 filled into the separation spaces 24 is stably held in the core 16.

Figure 2:
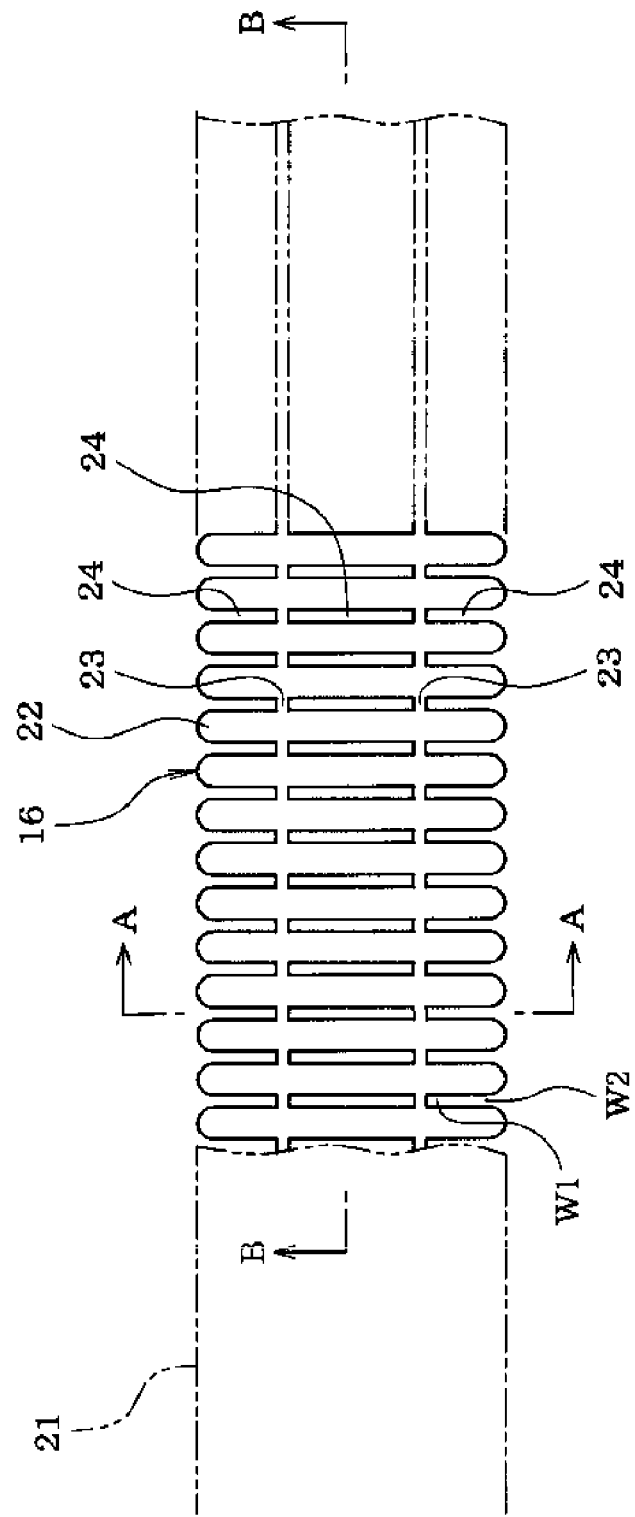
FIG. 2 is a plan view of a core of the first embodiment before being filled with a polymer material.

Moreover, as shown in FIG. 2, by making the width W2 of the separation spaces 24 positioned outside in the width direction smaller than the width W1 of the separation spaces 24 positioned inside, the filler polymer material P2 is prevented from being shifted outside in the width direction, so that the filler polymer material P2 can be held stably.

Figure 3:
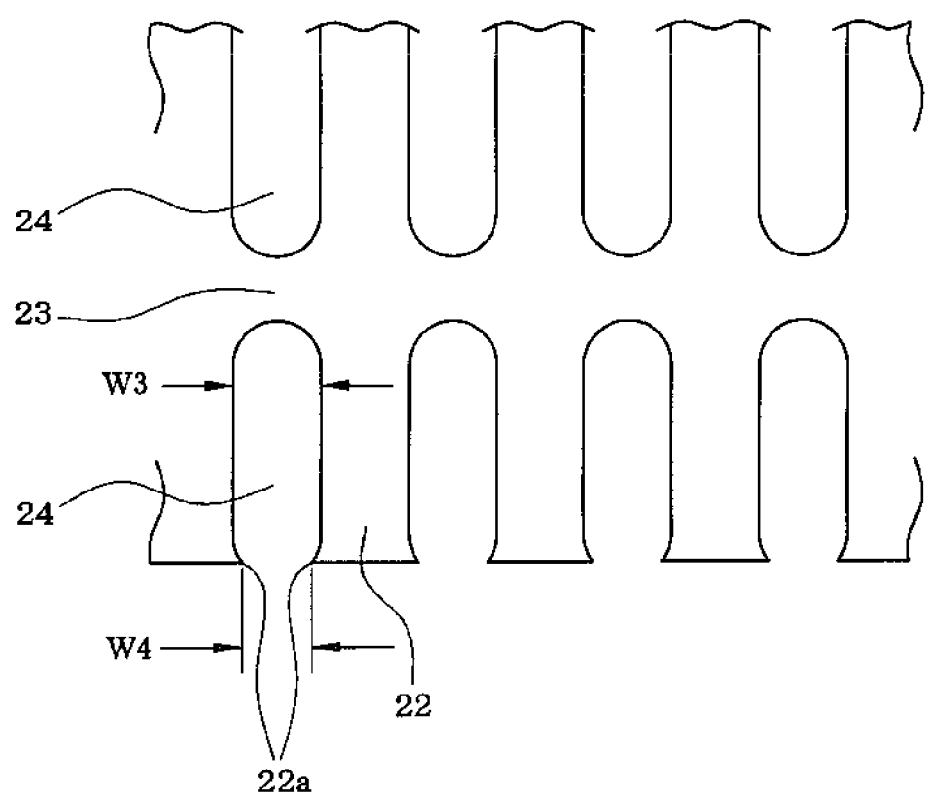
FIG. 3 is an enlarged plan view of an end in the width direction of a core according to a modification of the first embodiment before being filled with a polymer material.

As shown in FIG. 3, an effect similar to that described above can be obtained by forming pointed corners 22a on ends of the core pieces 22 in the width direction such that the pointed corners 22a protrude toward adjacent core pieces 22. Also in this case, the width W4 of portions of the separation spaces 24 positioned outside in the width direction is smaller than the width W3 of portions of the separation spaces 24 positioned inside.

In this manner, the separation spaces 24 of the core 16 are filled with the filler polymer material P2 and the entire surface of the core 16 is covered with the filler polymer material P2.

Figure 8:
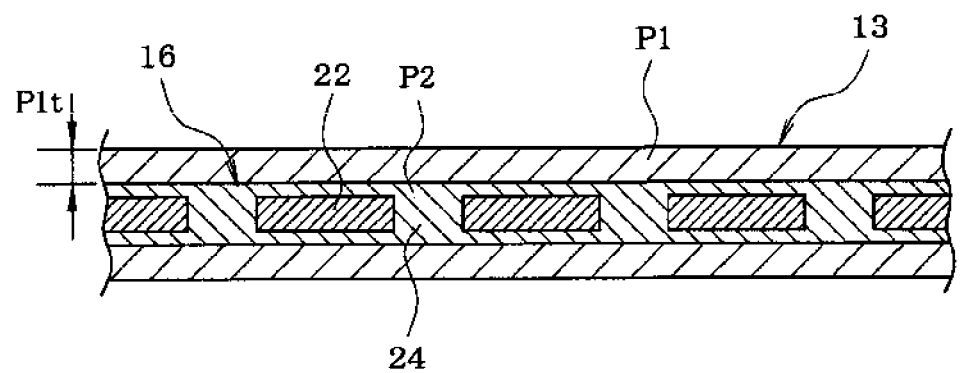
FIG. 8 is a partial schematic view of a weatherstrip of the first embodiment.

Thus, as shown in FIG. 8, when forming the weatherstrip 13, the portions of the trim polymer material P1 covering the core pieces 22 and the connection portions 23 have a thickness substantially the same as the thickness of the portions of the trim polymer material P1 covering the separation spaces 24 filled with the filler polymer material P2. Moreover, the thickness ($P1t$) of the trim polymer material P1 is set at a value equal to or smaller than three times (preferably equal to or smaller than a value in the range of 2.5 to 2 times) the thickness (t) of the core 16.

The filler polymer material P2 has a lower hardness and is more flexible than the core material 21 at room temperature to such an extent as not to prevent the adjacent core pieces 22 from being moved closer to or away from each other, and the filler polymer material P2 is capable of being chemically joined to the trim polymer material P1. The filler polymer material P2, for example, has a durometer hardness HDA in the range of 5 to 60 (preferably HDA in the range of 10 to 50) according to JIS K7215 and is more flexible than the trim polymer material P1. Thus, the filler polymer material P2 filled into the separation spaces 24 serves to prevent axial bending of the core 16 from being hindered, thereby securing a high axial bendability of the weatherstrip 13 with the embedded core 16. As the filler polymer material P2, for example, elastic rubber mainly composed of EPDM or elastically deformable olefin system thermoplastic synthetic resin is used.

Moreover, when filling the filler polymer material P2 into the separation spaces 24, the filler polymer material P2 can be filled into small spaces with a low flow resistance. Therefore, the filler polymer material P2 is filled into the spaces between the edges of the core pieces 22 and between the edges of the connection portions 23 without generating air gaps, so that the surfaces of the weatherstrip 13 are prevented from being deformed (protruded or depressed) as the air gaps expand or contract due to a change in temperature. Moreover, substantially the same amount of the filler polymer material P2 is filled into each of the separation spaces 24, so that a stable function of the core 16 is secured along the entire length in the longitudinal direction.

Figure 4:
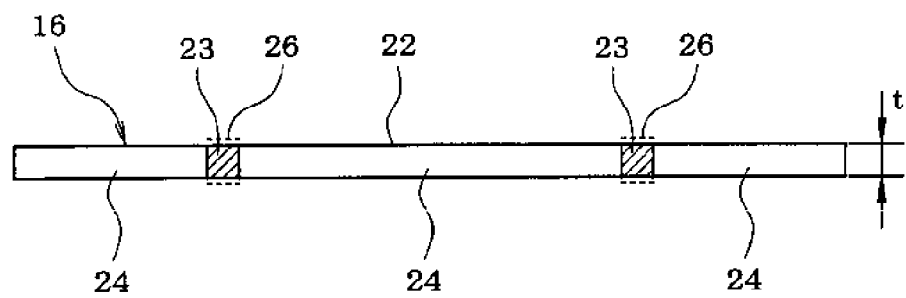
FIG. 4 is a sectional view taken along line A-A of FIG. 2.
Figure 5:
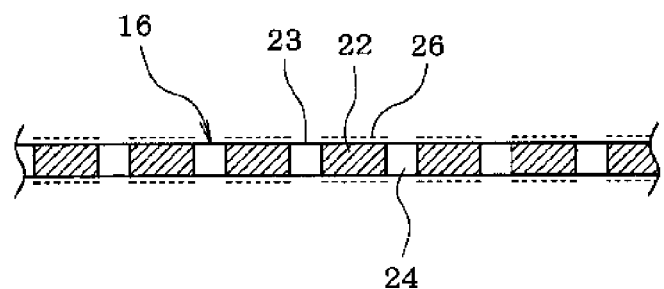
FIG. 5 is a sectional view taken along line B-B of FIG. 2.

Moreover, in the first embodiment, as shown in FIGS. 4 and 5, before the filler polymer material P2 is filled into the separation spaces 24, a non-adhesive layer 26 is formed on the surfaces of the core pieces 22 and the connection portions 23 so that the non-adhesive layer 26 is disposed between the core pieces 22 and the connection portions 23 and the filler polymer material P2. The non-adhesive layer 26 serves to prevent the filler polymer material P2 from sticking to the core pieces 22 and the connection portions 23 so as to prevent the core 16 from becoming hard to bend. Thus, bendability of the weatherstrip 13 with the embedded core 16 is secured. The non-adhesive layer 26 is made of, for example, silicone resin, oil, wax, or paraffin. If the core material 21 and the filler polymer material P2 are non-adhesive, the non-adhesive layer 26 may be omitted.

Next, referring to FIGS. 9 to 19, an apparatus and a method for manufacturing the weatherstrip 13 are described. In FIGS. 12 to 17, for convenience of description, members such as the core 16 (16A to 16C) and the filler polymer material P2 are exaggerated and enlarged in the thickness direction.

Figure 9:
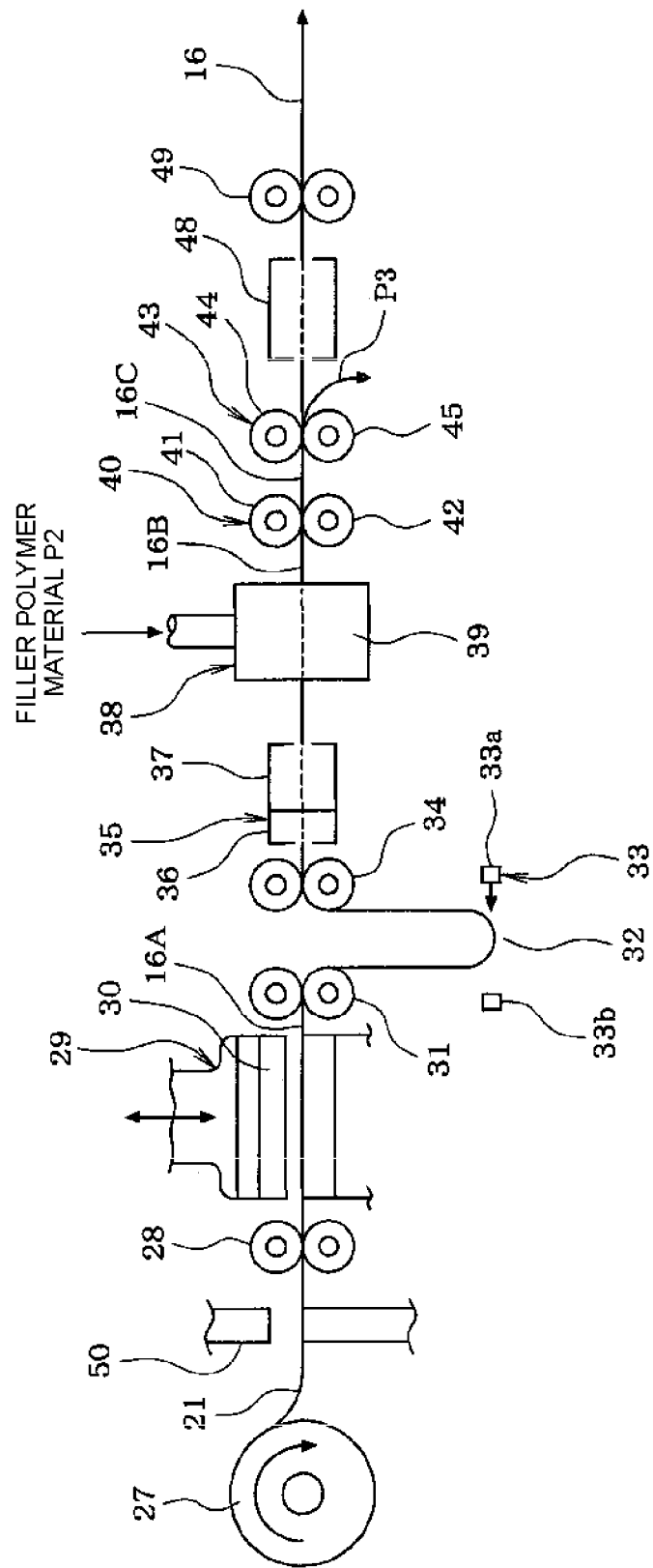
FIG. 9 is a schematic structural view (part one) of an apparatus for manufacturing a weatherstrip of the first embodiment.

First, referring to FIG. 9, an apparatus and a method for manufacturing the core 16 are described. As shown in FIG. 9, the core material 21, which is substantially strip-shaped, is wound around an uncoiler 27, and the core material 21 is supplied from the uncoiler 27 and continuously fed in the longitudinal direction using feeding rollers 28 (core material feeding means), so that the core material 21 is supplied to a press machine 29 (separation space forming means). Between the uncoiler 27 and the feeding rollers 28, a core connector 50 such as a resistance welder or an adhesive tape applying machine is disposed. When the core material 21 wound around the uncoiler 27 has been completely fed out and the uncoiler 27 is replaced with a new uncoiler 27, the core connector 50 connects the trailing end, in the longitudinal direction, of the core material 21 supplied from the uncoiler 27 to the leading end, in the longitudinal direction, of the core material 21 supplied from the new uncoiler 27 by welding, applying an adhesive tape, or by another method so as to make the leading end and the trailing end continuous.

The press machine 29 has a press punching die 30. The press punching die 30 removes portions to become the separation spaces 24 from the core material 21 while leaving portions to become the core pieces 22 and portions to become the connection portions 23. The core material 21 is press punched using the press punching die 30 so that the portions to become the separation spaces 24 are removed and the portions to become the core pieces 22 and the portions to become the connection portions 23 are left. Thus, a separation space forming step is performed so as to form the core pieces 22, the connection portions 23, and the separation spaces 24 in the core material 21. With the separation space forming step, the core 16 that includes the core pieces 22, the connection portions 23, and the separation spaces 24, the separation spaces 24 not yet filled with the filler polymer material P2 (hereinafter referred to as an "unfilled core 16A"), is manufactured.

Subsequently, the unfilled core 16A is hauled from the press machine 29 using hauling rollers 31 and supplied in a accumulator 32, and the unfilled core 16A is temporarily kept in the accumulator 32 in a curved state. In the accumulator 32, a position sensor 33 (for example, an optical sensor including a light-emitting device 33a and a photodetector 33b) is disposed so as to check whether the length (kept amount) of the unfilled core 16A being kept is within a predetermined range. On the basis of an output from the position sensor 33, driving of the feeding rollers 28, the press machine 29, and the hauling rollers 31 is controlled, so that the length of the unfilled core 16A kept in the accumulator 32 is maintained within a predetermined range.

The unfilled core 16A kept in the accumulator 32 is continuously fed using feeding rollers 34 (core feeding means) in the longitudinal direction at a constant speed and supplied to a non-adhesive layer forming machine 35 (non-adhesive layer forming means). The non-adhesive layer forming machine 35 applies a non-adhesive agent onto the surfaces of the unfilled core 16A (the core pieces 22 and the connection portions 23) using a non-adhesive applicator 36, and the non-adhesive agent applied onto the surfaces of the unfilled core 16A is dried and solidified using a drying machine 37. Thus, a non-adhesive layer forming step is performed so as to form the non-adhesive layer 26 on the surfaces of the unfilled core 16A (see FIGS. 4 and 5).

The non-adhesive layer forming step may be performed so as to form the non-adhesive layer 26 on the surfaces of the core material 21 before the separation space forming step. Alternatively, by obtaining the core material 21 having a preformed non-adhesive layer 26, the non-adhesive layer forming step may be omitted.

Subsequently, a polymer material filling step is performed. In the polymer material filling step, using an extrusion machine 38 (polymer material filling means) and a leveling machine 40 (additional filling means), the filler polymer material P2 is filled into the separation spaces 24 of the unfilled core 16A during a period that the unfilled core 16A is substantially plate-shaped. Thus, as compared with the case when the filler polymer material P2 is filled into the separation spaces 24 of the core 16 after the core 16 is bent to have a substantially U-shaped cross section, the filler polymer material P2 can be more easily filled into the separation spaces 24. As the filler polymer material P2, thermoplastic synthetic resin or rubber can be used.

The extrusion machine 38 includes an extrusion die 39 for extruding the filler polymer material P2. The unfilled core 16A is continuously introduced into the extrusion die 39 in the longitudinal direction while the filler polymer material P2 is supplied into the extrusion die 39, thereby performing extrusion. Thus, primary filling is performed so as to fill the filler polymer material P2 into the separation spaces 24 of the unfilled core 16A, and the entire surface of the front and back sides of the unfilled core 16A (the outer surface side and the inner surface side of the weatherstrip 13) including the core pieces 22 and the connection portions 23 is covered with the filler polymer material P2.

Figure 12:
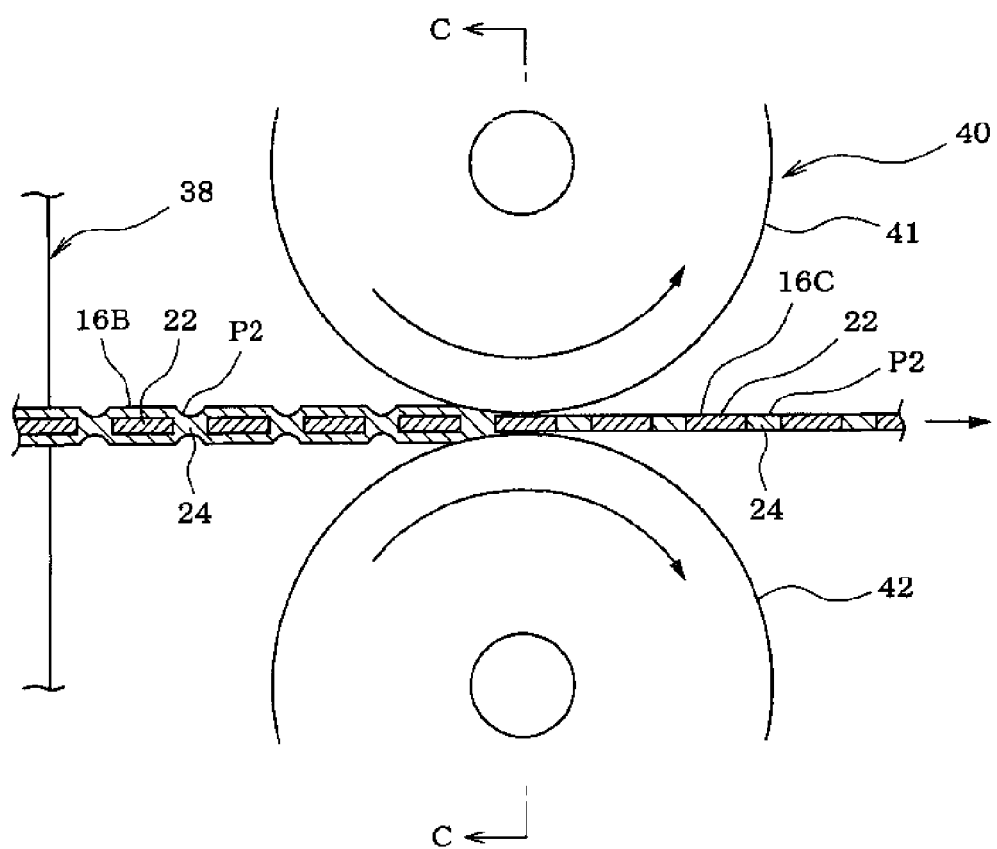
FIG. 12 is a side view of a leveling machine of the first embodiment.

Thus, as shown in FIG. 12, the core 16 having the separation spaces 24 primarily filled with the filler polymer material P2 (hereinafter referred to as a "primarily filled core 16B") is manufactured. On the surfaces of portions of the primarily filled core 16B corresponding to the separation spaces 24, recessed "sink marks" may occur due to mold shrinkage of the filler polymer material P2.

Figure 13:
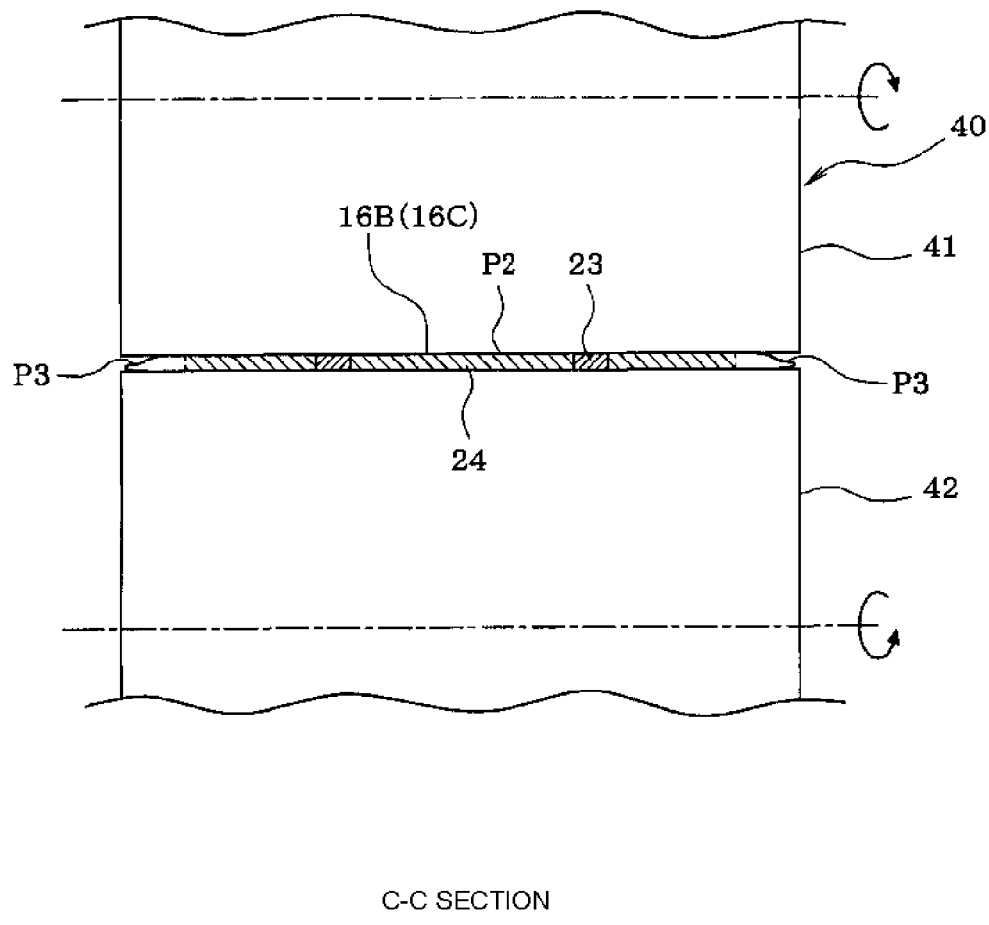
FIG. 13 is a sectional view taken along line C-C of FIG. 12.

As shown in FIGS. 12 and 13, the leveling machine 40 has a pair of leveling rollers 41 and 42 disposed so as to vertically nip the primarily filled core 16B. During a period that the filler polymer material P2 of the primarily filled core 16B supplied from the extrusion machine 38 is flowable (for thermoplastic synthetic resin, when the temperature is equal to or higher than the softening point; and, for rubber, before vulcanization or during vulcanization), the pair of leveling rollers 41 and 42 are rotated while the primarily filled core 16B supplied from the extrusion machine 38 is nipped and pressed between the rollers 41 and 42, so that the primarily filled core 16B is hauled by the rollers 41 and 42. At this time, the filler polymer material P2 on the surfaces of the core pieces 22 and the connection portions 23 is made thinner than before by being pressed to have a film-like or sheet-like form, and forcibly made to flow in the longitudinal and width directions. Thus, secondary filling (additional filling) is performed so as to sufficiently fill the filler polymer material P2 into the separation spaces 24, and the surface of the filler polymer material P2 covering the entire surface on the front and back sides of the core 16 (the outer surface side and the inner surface side of the weatherstrip 13) is made flat. Moreover, the filler polymer material P2 in a film-like or sheet-like form covering the core pieces 22 and the connection portions 23 is made to have a thickness (P2t) that does not exceed the thickness of the core pieces 22 and the connection portions 23 and made to be continuous with the filler polymer material P2 filled into the separation spaces 24 in a compressed state.

Thus, the core 16 having the separation spaces 24 sufficiently filled with the filler polymer material P2 and the entire surface of which is covered with the filler polymer material P2 (hereinafter referred to as a "filled core 16C"), is manufactured. At this time, as shown in FIG. 13, the excess filler polymer material P3 may overflow in an irregular shape from both ends of the filled core 16C (the core pieces 22) in the width direction.

Figure 14:
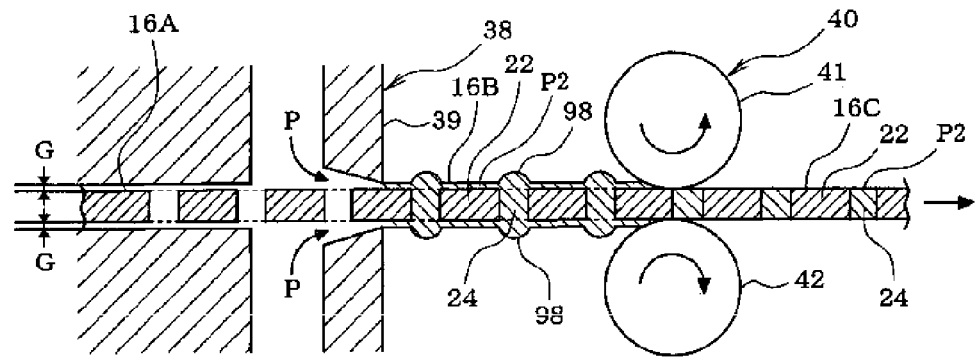
FIG. 14 is a figure illustrating a state in which projections occurred on the front and back surfaces of a primarily filled core.
Figure 15:
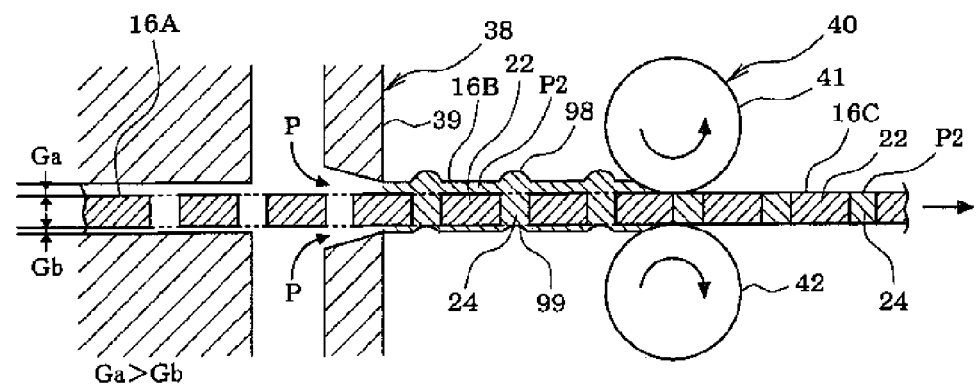
FIG. 15 is a figure (part one) illustrating a state in which projections occurred on one of the front and back surfaces of a primarily filled core.
Figure 16:
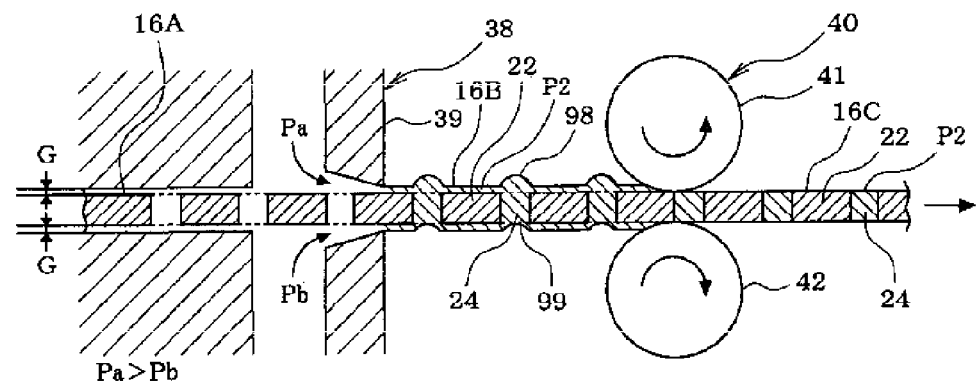
FIG. 16 is a figure (part two) illustrating a state in which projections occurred on one of the front and back surfaces of a primarily filled core.

As shown in FIGS. 14 to 16, when primary filling is performed using the extrusion machine 38 in the polymer material filling step, if the filler polymer material P2 is a rubber, projections 98 may occur on the surfaces (both of the front and back surfaces or one of the surfaces) of portions of the primarily filled core 16B corresponding to the separation spaces 24.

(a) As shown in FIG. 14, when the projections 98 occur on the front and back surfaces of the portions of the primarily filled core 16B corresponding to the separation spaces 24, the reason is considered as follows. When the unfilled core 16A passes through the extrusion die 39, the filler polymer material P2 (rubber material) is filled into the separation spaces 24 in a compressed state (FIG. 14 shows an example in which gap widths G between the die surfaces of the extrusion die 39 and the front and back surfaces of the unfilled core 16A are substantially the same, and compressive forces P applied to the filler polymer material P2 on the front and back surfaces of the unfilled core 16A are substantially the same). Subsequently, when the primarily filled core 16B is extruded from the extrusion die 39, the filler polymer material P2 is released from the compressed state, so that the filler polymer material P2, which has been compressed, is deformed by expansion. Therefore, the filler polymer material P2 protrudes outside the separation spaces 24 on the front and back sides of the primarily filled core 16B, whereby the projections 98 occur on the front and back surfaces.

(b) As shown in FIG. 15, when the projections 98 occur on one of the front and back surfaces of the portions of the primarily filled core 16B corresponding to the separation spaces 24 and recesses 99 occur on the other surface, the reason (part one) is considered as follows. When the unfilled core 16A passes through the extrusion die 39, the unfilled core 16A may be displaced in the thickness direction, and gap widths between the die surface of the extrusion die 39 and the front and back surfaces of the unfilled core 16A may become different (FIG. 15 shows an example in which a gap width Ga on the upper side of the unfilled core 16A is larger than a gap width Gb on the lower side of the unfilled core 16A). As a result, on a side on which the gap between the die surface of the extrusion die 39 and the unfilled core 16A is larger (the upper side in FIG. 15), the filler polymer material P2 (rubber material) is filled into the separation spaces 24 in a compressed state, while, on a side on which the gap is smaller (the lower side in FIG. 15), the filler polymer material P2 is not sufficiently filled into the separation spaces 24. When the primarily filled core 16B is subsequently extruded from the extrusion die 39, the filler polymer material P2 is released from the compressed state, so that, on the side with the larger gap, the filler polymer material P2 that has been compressed is deformed by expansion and protrudes outside the separation spaces 24, whereby the projections 98 occur. On the other hand, on the side with the smaller gap, the filler polymer material P2 is pulled by a protrusion force of the filler polymer material P2 on the side with the larger gap, so that the filler polymer material P2 is recessed to the inside of the separation spaces 24, whereby the recesses 99 occur.

(c) As shown in FIG. 16, when the projections 98 occur on one of the front and back surfaces of the portions of the primarily filled core 16B corresponding to the separation spaces 24 and the recesses 99 occur on the other surface, the reason (part two) is considered as follows. When the unfilled core 16A passes through the extrusion die 39, different compressive forces may act on the filler polymer material P2 (rubber material) on the front and back sides of the unfilled core 16A or the compressive forces may fluctuate (FIG. 16 shows an example in which a compressive force Pa on the upper side of the unfilled core 16A is larger than a compressive force Pb on the lower side). As a result, on a side on which the compressive force is large (the upper side in FIG. 16), the filler polymer material P2 is filled into the separation spaces 24 in a compressed state, while, on a side on which the compressive force is smaller (the lower side in FIG. 16), the filler polymer material P2 is not sufficiently filled into the separation spaces 24. When the primarily filled core 16B is subsequently extruded from the extrusion die 39, the filler polymer material P2 is released from the compressed state, so that, on the side with the larger compression force, the filler polymer material P2 that has been compressed is deformed by expansion and protrudes outside the separation spaces 24, whereby the projections 98 occur. On the other hand, on the side with the smaller compression force, the filler polymer material P2 is pulled by a protrusion force of the filler polymer material P2 on the side with the larger compression force, so that the filler polymer material P2 is recessed to the inside of the separation spaces 24, whereby the recesses 99 occur.

Presumably, the projections 98 in the case (b) and the projections 98 in the case (c) occur independently or in a combined manner. Regarding the projections 98 in any of the cases (a) to (c), after performing primary filling by using the extrusion machine 38, the projections 98 can be flattened by flowing the filler polymer material P2 of the projections 98 (protruding portions) in the width direction of the primarily filled core 16B using the leveling rollers 41 and 42 of the leveling machine 40, so that the surfaces of the primarily filled core 16B can be made flat.

If the projections 98 cannot be flattened by the single pair of leveling rollers 41 and 42, additional leveling rollers may be provided downstream so as to stably flatten the projections 98.

If only one of the front and back surfaces of the primarily filled core 16B can be flattened, when forming the weatherstrip 13, the core 16 may be disposed in such a manner that the flattened side of the core 16 is on a side of the weatherstrip 13 that is visible from the outside. Thus, projections and recesses are prevented from occurring on the surface of the weatherstrip 13 that is visible from the outside.

Figure 17:
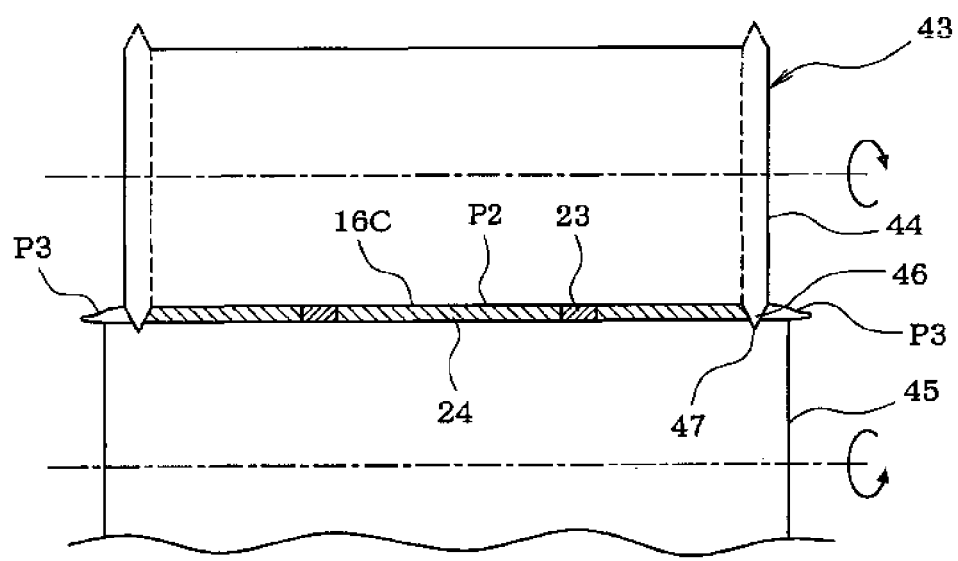
FIG. 17 is a sectional view of a trimming machine of the first embodiment.

After performing the polymer material filling step, a trimming step is performed using a trimming machine 43 (trimming means) so as to trim excess filler polymer material P3 that has overflowed from both ends of the filled core 16C (the core pieces 22) in the width direction. As shown in FIG. 17, the trimming machine 43 is disposed in such a manner that a pair of trimming rollers 44 and 45 vertically nip the filled core 16C. On an outer peripheral surface of the upper trimming roller 44, cut-off blades 46 are disposed so as to trim the excess filler polymer material P3 that has overflowed from both ends of the filled core 16C in the width direction. On an outer peripheral surface of the lower trimming roller 45, blade receiving grooves 47 corresponding to the cut-off blades 46 are disposed.

The trimming machine 43 rotates the trimming rollers 44 and 45 in a state in which the filled core 16C fed from the leveling machine 40 is nipped between the pair of rollers 44 and 45. Thus, while the rollers 44 and 45 feed the filled core 16C, the cut-off blades 46 trim and remove the excess filler polymer material P3 that has overflowed from both ends of the filled core 16C in the width direction. At this time, in the first embodiment, the excess filler polymer material P3 is trimmed to a width slightly larger than the width of the filled core 16C (the core pieces 22), so that both ends of the core pieces 22 in the width direction are covered with the filler polymer material P2. Thus, the ends of the core pieces 22 are prevented from breaking through the weatherstrip 13 and being exposed to the outside. However, if the core pieces 22 are not likely to be exposed, the excess polymer material may be trimmed exactly at both ends of the core pieces 22 in the width direction.

Subsequently, as shown in FIG. 9, if the filler polymer material P2 is thermoplastic synthetic resin, the filled core 16C fed from the trimming machine 43 is supplied to a solidification treatment machine 48. The filler polymer material P2 of the filled core 16C is cooled and solidified, so that the filler polymer material P2 is securely held between adjacent core pieces 22. On the other hand, if the filler polymer material P2 is rubber, the filled core 16C fed from the trimming machine 43 is supplied to the cure treatment machine 48. The filler polymer material P2 of the filled core 16C is heated, vulcanized, and cured, so that the filler polymer material P2 is securely held between adjacent core pieces 22. Thus, manufacturing of the core 16 filled with the filler polymer material P2 finishes.

Subsequently, the core 16 is hauled by hauling rollers 49 from the solidification treatment machine 48 (or the cure treatment machine 48) and supplied to a core keeping machine 51 (see FIG. 10). If the core 16 filled with the filler polymer material P2 is obtained from the outside, equipment for manufacturing the core 16 shown in FIG. 9 and the step for manufacturing the core 16 are omitted. In this case, for example, an uncoiler, around which the core 16 filled with the filler polymer material P2 is wound, is disposed. The core 16 is supplied from the uncoiler and continuously fed by the feeding rollers in the longitudinal direction and supplied to the core keeping machine 51 (see FIG. 10).

Predetermined ranges of the leading and trailing ends of the core 16 in the longitudinal direction may not be filled with the filler polymer material P2, or the filler polymer material P2 may be filled into the ends and subsequently removed. Thus, when continuously feeding the core 16 in the longitudinal direction so as to manufacture the weatherstrip 13 with the embedded core 16, the trailing end of the core 16 in the longitudinal direction and the leading end of a new core 16 can be connected to each other by welding or the like to be made continuous with each other. Moreover, portions for connecting the core 16 can be easily found afterwards.

Figure 10:
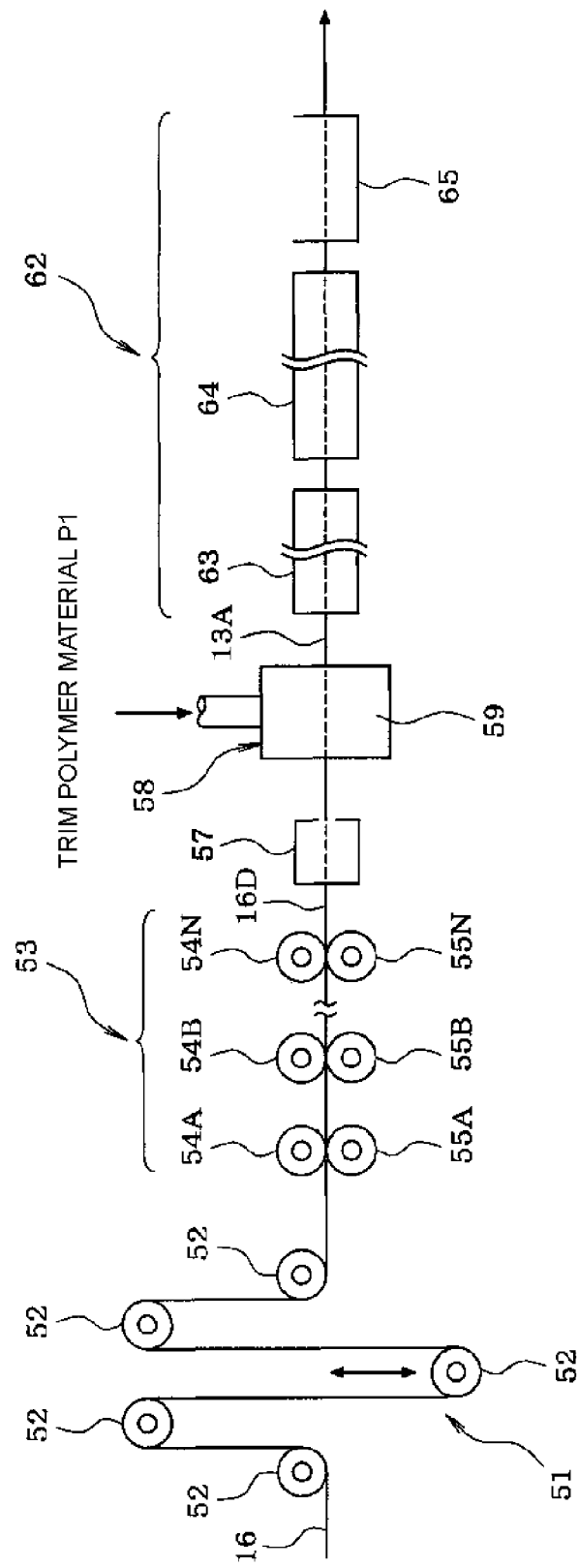
FIG. 10 is a schematic structural view (part two) of an apparatus for manufacturing a weatherstrip of the first embodiment continued from FIG. 9.

As shown in FIG. 10, the core keeping machine 51 includes a large number of rollers 52 arranged alternately in upper and lower positions, so that the rollers 52 serve to temporarily keep the core 16 bent in a zigzag manner or in a serpentine manner. Some of the large number of rollers 52 (for example, the roller in the middle) can move vertically so as to adjust the length (kept amount) of the core 16 kept in the core keeping machine 51 by adjusting the vertical positions of the vertically movable rollers 52.

The core 16 kept in the core keeping machine 51 is supplied to a core cold roll forming machine 53 (core forming means). The core cold roll forming machine 53 performs an intermediate forming step in which the core 16 is continuously bent in the longitudinal direction so as to provide the core 16 with a predetermined intermediate cross-sectional shape (hereinafter, the core 16 having an intermediate cross-sectional shape is referred to as a "core 16D", see FIG. 18).

Figure 18:
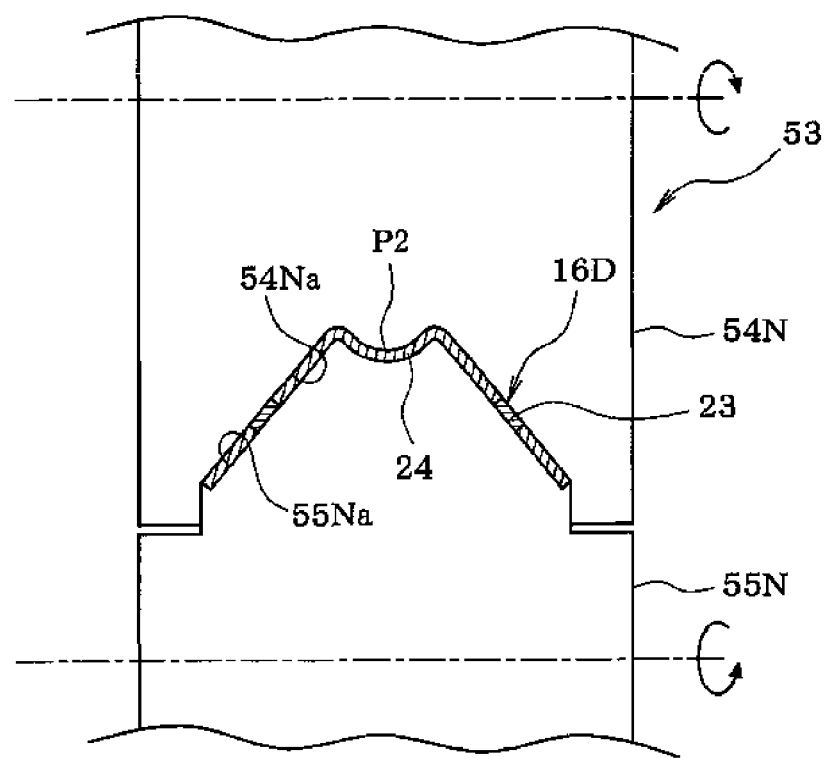
FIG. 18 is a sectional view of an upper roller and a lower roller of a core cold roll forming machine of the first embodiment.

The core cold roll forming machine 53 includes vertical pairs of forming rollers 54 and 55 arranged in the downstream direction so as to vertically nip the core 16. As shown in FIG. 18, forming rollers 54N and 55N at the downstream end have die surfaces 54Na and 55Na on the outer peripheral surfaces thereof so as to bend the core 16 into an intermediate cross-sectional shape (a cross-sectional shape of the core 16 that is wider than the final shape that is substantially U-shaped). The core cold roll forming machine 53 feeds the core 16 supplied from the core keeping machine 51 while gradually deforming the cross-sectional shape of the core 16 using the forming rollers 54A to 54N and 55A to 55N, so that the core 16 is bent into an intermediate cross-sectional shape.

Subsequently, the core 16D having an intermediate cross-sectional shape is continuously supplied to a pre-heating machine 57 that exploits high-frequency heating or the like. The core 16D having an intermediate cross-sectional shape is pre-heated by the pre-heating machine 57 and supplied to an extrusion machine 58 (extrusion molding means).

Figure 19:
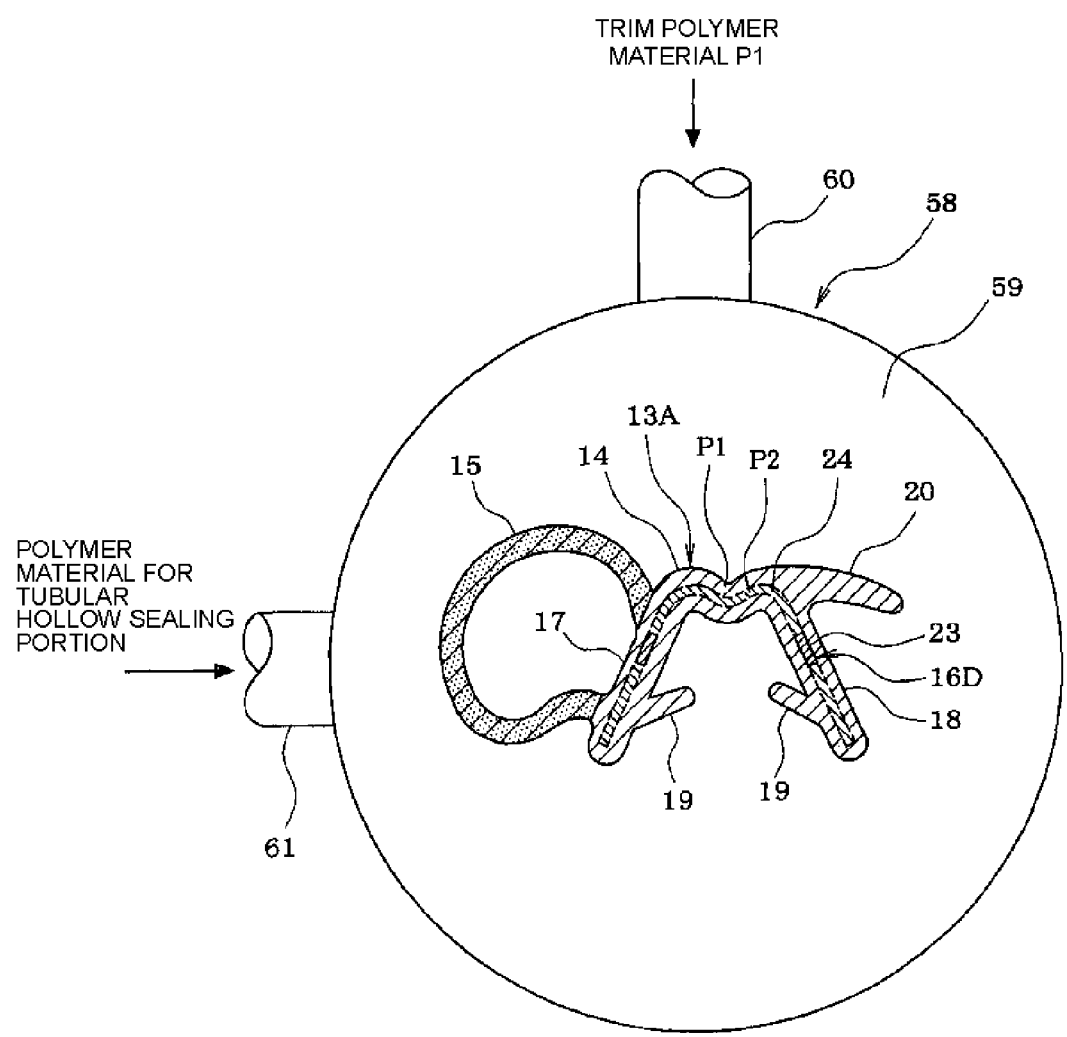
FIG. 19 is a sectional view of an exit side of an extrusion die of an extrusion machine of the first embodiment.

The extrusion machine 58 extrudes the weatherstrip 13 having a predetermined intermediate cross-sectional shape (the weatherstrip 13 having an intermediate cross-sectional shape is referred to as a "weatherstrip 13A", see FIG. 19), and performs an extrusion step so as to embed the core 16D having an intermediate cross-sectional shape in the mounting portion 14 of the weatherstrip 13A having an intermediate cross-sectional shape. As shown in FIG. 19, the extrusion machine 58 includes an extrusion die 59 for extruding the weatherstrip 13 in an intermediate cross-sectional shape (a cross-sectional shape of the mounting portion 14 that is slightly wider than the final shape that is substantially U-shaped). While continuously supplying the core 16D having an intermediate cross-sectional shape into the extrusion die 59 in the longitudinal direction, the trim polymer material P1 and a polymer material for the tubular hollow sealing portion are continuously supplied into the extrusion die 59 from respective supply orifices 60 and 61 in flowable states, so that the weatherstrip 13A having an intermediate cross-sectional shape (including the mounting portion 14 and the tubular hollow sealing portion 15) is extruded. Thus, the core 16D having an intermediate cross-sectional shape is covered with the trim polymer material P1 and the core 16D having an intermediate cross-sectional shape is embedded in the mounting portion 14 of the weatherstrip 13A having an intermediate cross-sectional shape.

Subsequently, as shown in FIG. 10, if the trim polymer material P1 and the polymer material for the tubular hollow sealing portion are rubber, the weatherstrip 13A having an intermediate cross-sectional shape fed from the extrusion machine 58 is supplied to a cure treatment machine 62 (treatment means). The cure treatment machine 62 heats the weatherstrip 13A by using a high-frequency heating machine 63 and a hot-air heating machine 64 so as to perform a treatment step for vulcanizing and curing the body of the weatherstrip 13A (an unvulcanized rubber portion that has been extruded by the extrusion machine 58) so as to quickly vulcanize and cure the body of the weatherstrip 13A. Subsequently, the weatherstrip 13A is cooled using a cooling machine 65 such as a cooling water bath.

At this time, for example, if both of the trim polymer material P1 and the filler polymer material P2 are rubber mainly composed of EPDM, the polymer materials are joined and integrated with each other at a contact portion by vulcanized adhesion in the treatment step. Thus, the trim polymer material P1 and the filler polymer material P2 can be solidly joined and integrated with each other by vulcanized adhesion of rubber.

If the trim polymer material P1 is rubber mainly composed of EPDM and the filler polymer material P2 is olefin system thermoplastic synthetic resin, the polymer materials are joined and integrated with each other at a contact portion by thermobonding in the extrusion step or in the treatment step. Thus, the trim polymer material P1 and the filler polymer material P2 can be solidly joined and integrated with each other by thermobonding between rubber and resin.

On the other hand, if the trim polymer material P1 and the polymer material for the tubular hollow sealing portion are thermoplastic synthetic resin, the high-frequency heating machine 63 and the hot-air heating machine 64 are omitted. The weatherstrip 13A having an intermediate cross-sectional shape fed from the extrusion machine 58 is cooled using the cooling machine 65 (treatment means) such as a cooling water bath. Thus, a treatment step for solidifying the body of the weatherstrip 13A (an unsolidified resin portion extruded by the extrusion machine 58) is performed so as to rapidly cool and solidify the body of the weatherstrip 13A.

At this time, for example, if both of the trim polymer material P1 and the filler polymer material P2 are olefin system thermoplastic synthetic resin, the polymer materials are joined to each other at a contact portion by thermobonding in the extrusion step. Thus, the trim polymer material P1 and the filler polymer material P2 can be solidly joined and integrated with each other by thermobonding of resin.

Figure 11:
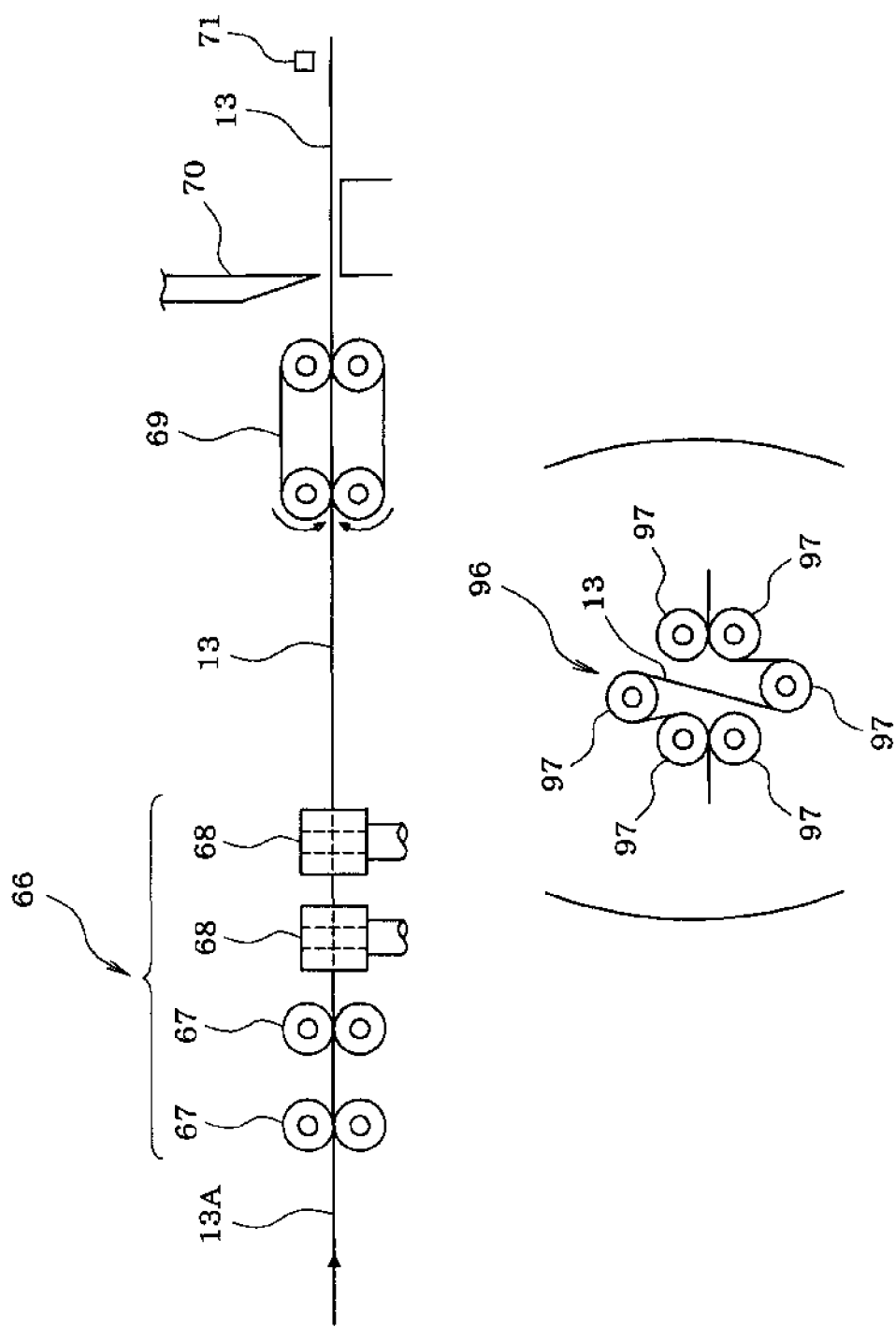
FIG. 11 is a schematic structural view (part three) of an apparatus for manufacturing a weatherstrip of the first embodiment continued from FIG. 10.

Subsequently, as shown in FIG. 11, the weatherstrip 13A having an intermediate cross-sectional shape is supplied to a trim cold roll forming machine 66 (final forming means). The trim cold roll forming machine 66 performs a final forming step so as to form the weatherstrip 13A having an intermediate cross-sectional shape into a final cross-sectional shape (see FIG. 1).

The trim cold roll forming machine 66 includes pairs of vertical forming rollers 67 arranged in the downstream direction so as to vertically nip the mounting portion 14 of the weatherstrip 13A. Downstream the vertical forming rollers 67, pairs of horizontal forming rollers 68 are disposed so as to nip the mounting portion 14 of the weatherstrip 13A from the left and right directions (horizontal directions). Using the vertical forming rollers 67 and the horizontal forming rollers 68, the trim cold roll forming machine 66 feeds the weatherstrip 13A having an intermediate cross-sectional shape, while gradually deforming and forming the weatherstrip 13A together with the core 16D, having an intermediate cross-sectional shape and embedded in the weatherstrip 13A, into a final cross-sectional shape (in which the mounting portion 14 and the core 16 have substantially U-shaped cross sectional shapes). Thus, the weatherstrip 13 having a final cross sectional shape can be efficiently formed.

Subsequently, the weatherstrip 13 having a final cross sectional shape, which is continuously fed out from the trim cold roll forming machine 66, is hauled using a hauling machine 69 and supplied to a cut-off machine 70. A position sensor 71 is disposed downstream at a predetermined distance from the cut-off machine 70. Every time the position sensor 71 detects a leading end of the weatherstrip 13, the cut-off machine 70 cuts off the weatherstrip 13, so that the weatherstrip 13 is cut to a predetermined length. Thus, manufacturing of the weatherstrip 13 with the embedded core 16 finishes.

In the first embodiment described above, the filler polymer material P2 is filled into the separation spaces 24 of the core 16, and the entire surface of the core 16 is covered with the filler polymer material P2. Thus, when forming the weatherstrip 13, the trim polymer material P1 can be made to have substantially the same thickness (P1t) at portions covering the core pieces 22 and the connection portions 23 and at portions covering the separation spaces 24 filled with the filler polymer material P2, so that the difference in mold shrinkage of the trim polymer material P1 in the thickness direction can be substantially eliminated. Thus, recessed marks are prevented from occurring on the surfaces of the mounting portion 14 of the weatherstrip 13.

Furthermore, it is not necessary that the thickness (P1t) of the trim polymer material P1 covering the core 16 be large. Even when the thickness of the trim polymer material P1 covering the core 16 is small (typically, equal to or smaller than three times the thickness (t) of the core 16), recessed marks are prevented from occurring on the surfaces of the mounting portion 14 of the weatherstrip 13. Thus, the thickness (P1t) of the trim polymer material P1 can be made smaller than before and the amount of the trim polymer material P1 can be reduced, so that the demand for reducing the weight and cost of the weatherstrip 13 is satisfied.

As the filler polymer material P2, inexpensive material (for example, recycled material or waste material), which may be inferior to new material in terms of strength and performance, can be used at low cost, so that the material can be effectively utilized.

Moreover, since the filler polymer material P2 is filled into the separation spaces 24 in advance, air gaps (small spaces) remaining between the core pieces 22 are reduced. Thus, the surfaces of the mounting portion 14 of the weatherstrip 13 are prevented from being deformed due to expansion and contraction of the air gaps caused by a change in temperature in the step of manufacturing the weatherstrip 13 (for example, a change in temperature during the heat curing step or the cool solidifying step of the trim polymer material P1) or by a change in temperature after the weatherstrip 13 has been manufactured (for example, a change in temperature after the weatherstrip 13 is attached to a vehicle).

In the first embodiment, the extrusion machine 38 performs primary filling so as to fill the filler polymer material P2 into the separation spaces 24 of the unfilled core 16A while covering the entire surface of the unfilled core 16A including the core pieces 22 and the connection portions 23 with the filler polymer material P2. Subsequently, during a period that the filler polymer material P2 is flowable, the leveling machine 40 performs secondary filling (additional filling) so as to flow the filler polymer material P2 on the surfaces of the core pieces 22 and the connection portions 23 in the longitudinal and width directions, so that the filler polymer material P2 is sufficiently filled into the separation spaces 24. Thus, even if the filler polymer material P2 is not sufficiently filled into the separation spaces 24 by primary filling, the filler polymer material P2 can be sufficiently filled into the separation spaces 24 by secondary filling.

Second Embodiment

Figure 20:
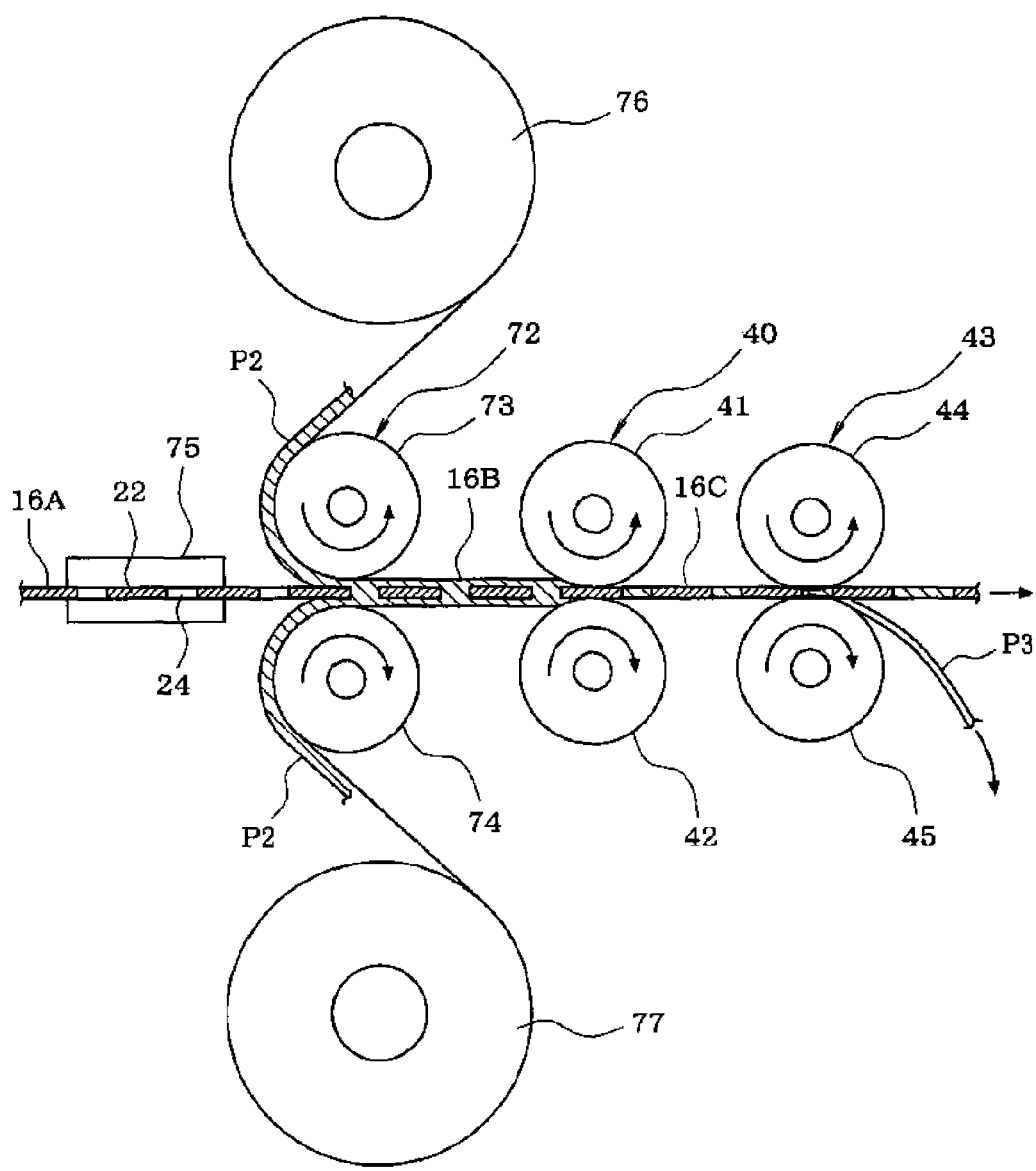
FIG. 20 is a side view of a press roller machine of a second embodiment and the surrounding area.

Next, referring to FIG. 20, a second embodiment of the present invention is described. In order to simplify description, the same numerals are used for the members substantially the same as those of the first embodiment, and the differences from the first embodiment are mainly described. In FIG. 20, for convenience of description, members such as the core 16 (16A to 16C) and the filler polymer material P2 are exaggerated and enlarged in the thickness direction.

In the first embodiment, the extrusion machine 38 performs primary filling so as to fill the filler polymer material P2 into the separation spaces 24 of the unfilled core 16A. On the other hand, in the second embodiment, as shown in FIG. 20, a press roller machine 72 (polymer material filling means) performs primary filling by pressing the filler polymer material P2 in tape form against the unfilled core 16A in the longitudinal direction so as to fill the filler polymer material P2 into the separation spaces 24.

As shown in FIG. 20, the press roller machine 72 includes a pair of press rollers 73 and 74 disposed so as to vertically nip the unfilled core 16A. Upstream the press roller machine 72, a heating machine 75 is disposed so as to heat the unfilled core 16A to a predetermined temperature (a temperature at which the filler polymer material P2 becomes flowable). Moreover, uncoilers 76 and 77, around which the filler polymer material P2 in tape form is wound, are disposed above and below the press roller machine 72, respectively.

The press roller machine 72 rotates the pair of press rollers 73 and 74 while the press rollers 73 and 74 press and nip the filler polymer material P2 in tape form supplied from the upper uncoiler 76, the heated unfilled core 16A supplied from the heating machine 75, and the filler polymer material P2 in tape form supplied from the lower uncoiler 77 therebetween. Thus, the rollers 73 and 74 press the filler polymer material P2 in tape form against the unfilled core 16A in the longitudinal direction, while hauling the unfilled core 16A and the filler polymer material P2 in tape form. Thus, primary filling is performed so as to fill the filler polymer material P2 into the separation spaces 24, and the entire surface on the front and back sides of the unfilled core 16A (the outer surface side and the inner surface side of the weatherstrip 13) including the core pieces 22 and the connection portions 23 is covered with the filler polymer material P2.

With the second embodiment described above, the filler polymer material P2 can be efficiently filled into the separation spaces 24 of the core 16.

Third Embodiment

Figure 21:
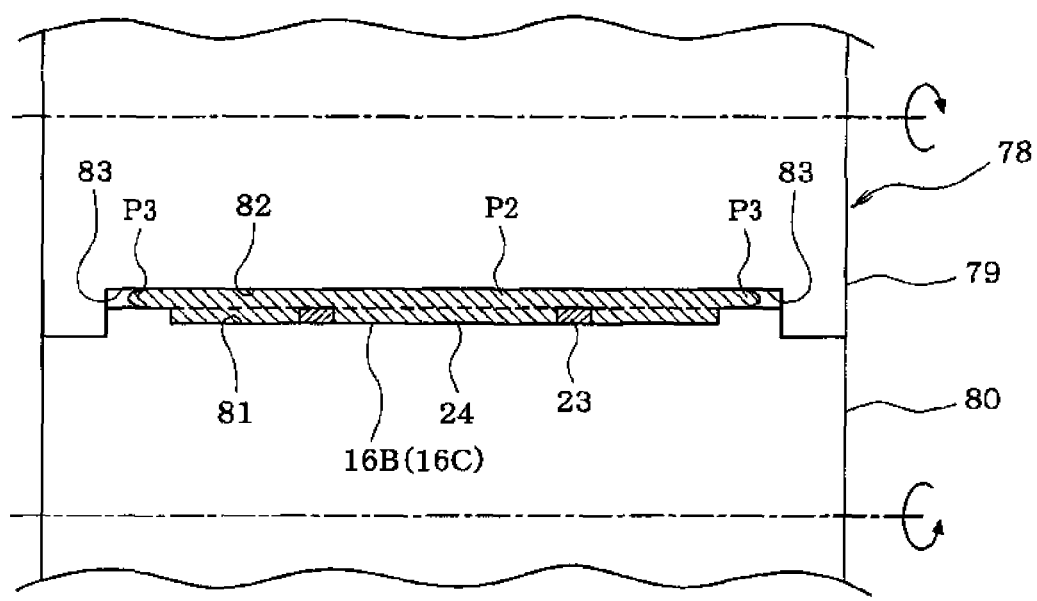
FIG. 21 is a sectional view of a leveling machine of a third embodiment.

Next, referring to FIG. 21, a third embodiment of the present invention is described. In order to simplify description, the same numerals are used for the members substantially the same as those of the first embodiment, and the differences from the first embodiment are mainly described. In FIG. 21, for convenience of description, members such as the core 16 (16B and 16C) and the filler polymer material P2 are exaggerated and enlarged in the thickness direction.

In each of the first and second embodiments, the entire surface on the front and back sides of the core 16 (the outer surface side and the inner surface side of the weatherstrip 13) is covered with the filler polymer material P2. On the other hand, in the third embodiment, as shown in FIG. 21, one side of the core 16 (for example, the outer surface side of the weatherstrip 13) is mainly covered with the filler polymer material P2 by using a leveling machine 78 (additional filling means).

As shown in FIG. 21, the leveling machine 78 includes a pair of leveling rollers 79 and 80 disposed so as to vertically nip the primarily filled core 16B therebetween. On the outer peripheral surface of the lower leveling roller 80, a groove 81 for a core is formed so that the primarily filled core 16B can be fittingly placed therein. On the outer peripheral surface of the upper leveling roller 79, a groove 82 for polymer material is formed so as to flow the filler polymer material P2 onto a surface mainly on one side of the primarily filled core 16B (for example, the outer surface side of the weatherstrip 13). Moreover, on both ends of the groove 82 for polymer material, grooves 83 for excessive polymer material are formed so that the excess filler polymer material P3 that has overflowed from both ends of the filled core 16C (the core pieces 22) in the width direction can flow thereinto.

The leveling machine 78 rotates the leveling rollers 79 and 80 while the rollers 79 and 80 press and nip the primarily filled core 16B supplied thereto. Thus, while hauling the primarily filled core 16B by the rollers 79 and 80 during a period that the filler polymer material P2 of the primarily filled core 16B is flowable, secondary filling (additional filling) is performed so as to flow the filler polymer material P2 on the surfaces of the core pieces 22 and the connection portions 23 in the longitudinal and width directions, so that the filler polymer material P2 is sufficiently filled into the separation spaces 24. Moreover, by flowing filler polymer material P2 mainly on a surface on one side of the primarily filled core 16B (for example, the outer surface side of the weatherstrip 13), the one side of the core 16 (for example, the outer surface side of the weatherstrip 13) is mainly covered with the filler polymer material P2.

With the third embodiment described above, recessed marks are prevented from occurring on the surfaces of the mounting portion 14 of the weatherstrip 13.

Fourth Embodiment

Figure 22:
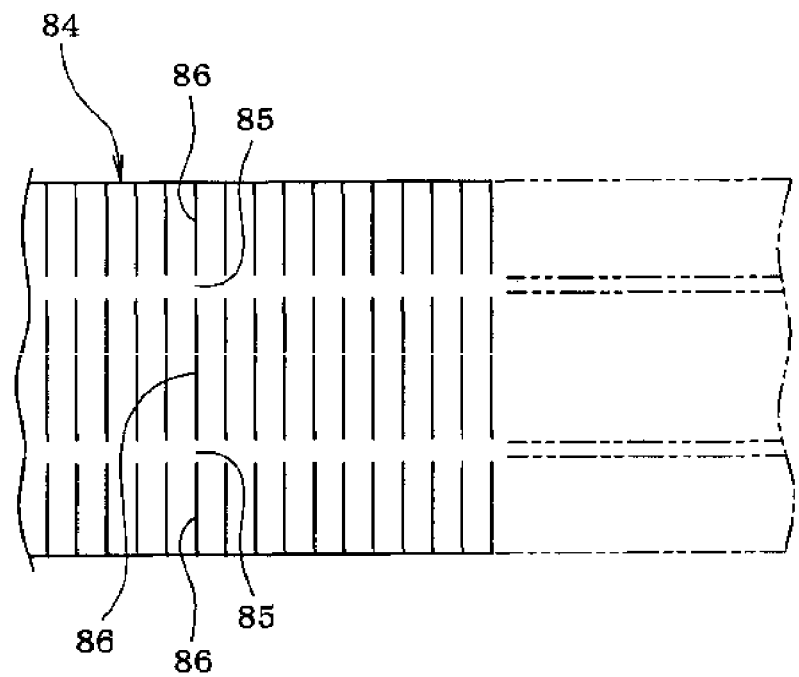
FIG. 22 is a plan view of a core material of a fourth embodiment after slits have been formed.
Figure 23:
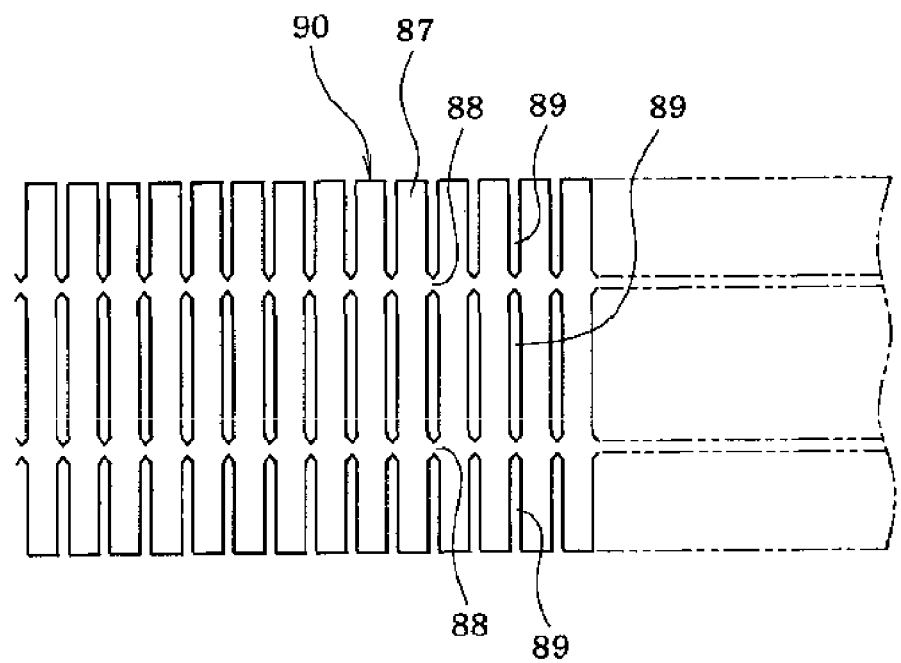
FIG. 23 is a plan view of a core of the fourth embodiment before being filled with a polymer material.
Figure 24:
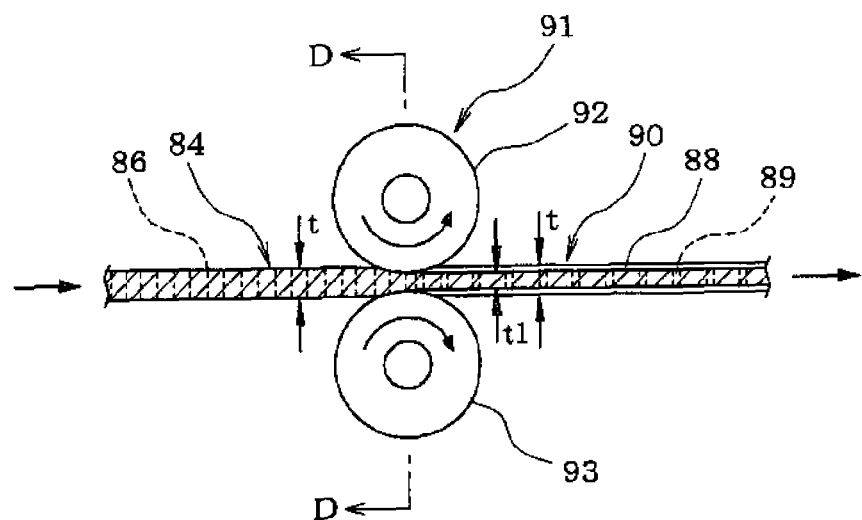
FIG. 24 is a side view of a rolling roller machine of the fourth embodiment.
Figure 25:
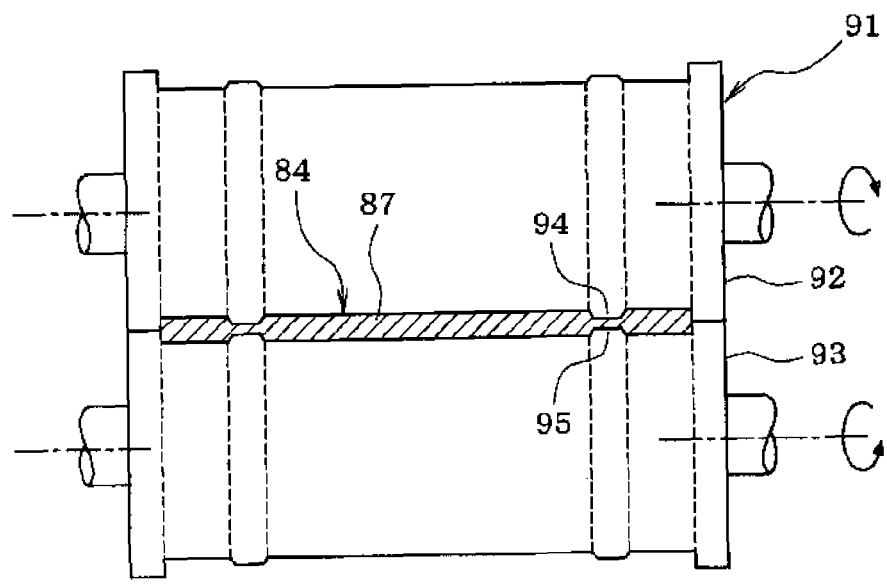
FIG. 25 is a sectional view taken along line D-D of FIG. 24.

Referring to FIGS. 22 to 25, a fourth embodiment of the present invention is described. In order to simplify description, the same numerals are used for the members substantially the same as those of the first embodiment, and the differences from the first embodiment are mainly described. In FIGS. 24 and 25, for convenience of description, members such as a core material 84 and a core 90 are exaggerated and enlarged in the thickness direction.

In the first embodiment, the substantially strip-shaped core material 21 is press punched so as to remove the portions corresponding to the separation spaces 24, so that the core 16 (a core not yet filled with the filler polymer material P2) including the core pieces 22, the connection portions 23, and the separation spaces 24 is manufactured. On the other hand, in the fourth embodiment, as shown in FIG. 22, using a slit forming machine (not shown), a plurality of slits 86 extending in the width direction are formed at a predetermined interval in the longitudinal direction so as to leave portions 85 of the substantially strip-shaped core material 84 to become connection portions 88 (see FIG. 23). Subsequently, using a rolling roller machine 91 (separation space forming means), the portions 85 of the core material 84 to become the connection portions 88 are rolled and extended in the longitudinal direction and the slits 86 are enlarged in the longitudinal direction. Thus, as shown in FIG. 23, a core 90 (a core not yet filled with the filler polymer material P2) including core pieces 87, the connection portions 88, and separation spaces 89 is manufactured. In the fourth embodiment, instead of the press machine 29 and the hauling rollers 31 used in the first embodiment, the slit forming machine (not shown) and a rolling roller machine 91 are used.

As shown in FIGS. 24 and 25, the rolling roller machine 91 includes a pair of milling rollers 92 and 93 disposed so as to vertically nip the core material 84. On the outer peripheral surfaces of the rollers 92 and 93, circular projections 94 and 95 are formed so that the portions 85 of the core material 84 to become the connection portions 88 are rolled and extended in the longitudinal direction. In the fourth embodiment, the gap widths between circular projections 94 and 95 are set such that the portions 85 of the core material 84 to become the connection portions 88 are rolled and thinned to a thickness t1 that is, for example, in the range of 90 to 50% of the thickness before rolling (the thickness t of the core material 84).

The rolling roller machine 91 rotates the pair of milling rollers 92 and 93 while the rollers 92 and 93 nip and press the core material 84 in which the slits 86 are formed. Thus, while the rollers 92 and 93 feed the core material 84, the portions 85 of the core material 84 to become the connection portions 88 are rolled and extended in the longitudinal direction using the circular projections 94 and 95, and the slits 86 are enlarged in the longitudinal direction. At this time, the portions 85 to become the connection portions 88 and a part of the portions to become the core pieces 87 are slightly rolled in the width direction. Thus, as shown in FIG. 23, the core 90 (a core not yet filled with the filler polymer material P2) including the core pieces 87, the connection portions 88, and the separation spaces 89 is manufactured.

With the fourth embodiment described above, the core 90 (a core not yet filled with the filler polymer material P2) including the core pieces 87, the connection portions 88, and the separation spaces 89 can be efficiently manufactured.

When using the core 90 of the fourth embodiment, the entire surface on the front and back sides of the core 90 may be covered with the filler polymer material P2, or a surface on one side of the core 90 may be mainly covered with the filler polymer material P2. Only thin rolled portions of the core 90 may be covered with the filler polymer material P2, and the filler polymer material P2 covering the rolled portions may be continuous with the filler polymer material P2 filled into the separation spaces 89. Also in this manner, the filler polymer material P2 covering the rolled portions can connect the portions of the filler polymer material P2 filled into the separation spaces 89 to each other, so that the filler polymer material P2 filled into the separation spaces 89 can be stably held by the core 90.

In each of the first to third embodiments, the core pieces 22 are connected to each other through the connection portions 23 in the longitudinal direction even after the weatherstrip 13 is extruded and the core 16 is embedded in the mounting portion 14. On the other hand, when using the core 90 of the fourth embodiment, after the weatherstrip 13 has been extruded and the core 90 has been embedded in the mounting portion 14, the core pieces 87 may be separated in the longitudinal direction by breaking the connection portions 88. In this case, as shown in FIG. 11, a connection breaking machine 96 is disposed between the trim cold roll forming machine 66 and the hauling machine 69. A large number of braking rollers 97 of the connection breaking machine 96 serve to bend the weatherstrip 13 with a comparatively small radius of curvature and make the weatherstrip 13 extend in the longitudinal direction so that the connection portions 88 of the core 90 are extended beyond the limit of extension, whereby the connection portions 88 are broken and the core pieces 87 are separated in the longitudinal direction. Thus, the axis of the weatherstrip 13 shown in FIG. 1 can be easily bent in the left-right direction of the figure, so that the bendability of the weatherstrip 13 can be further improved.

Figure 26:
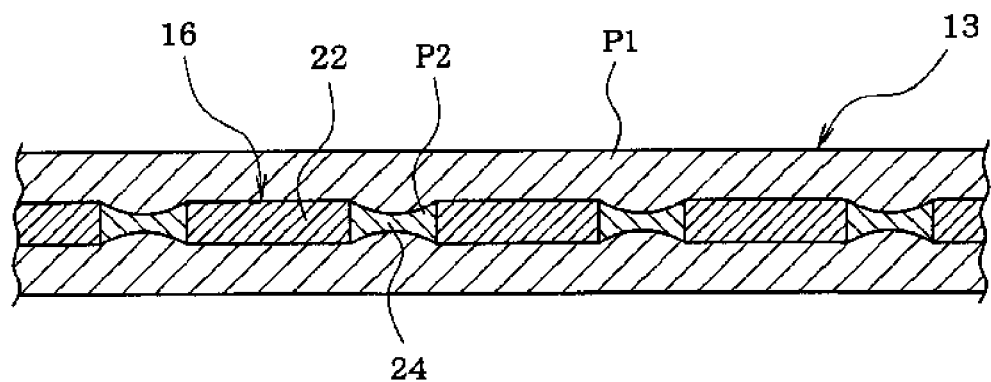
FIG. 26 is a partial schematic view of a weatherstrip of another embodiment.

In each of the first to fourth embodiments, surfaces on both sides of the core 16 are covered or a surface on one side of the core 16 is covered with the filler polymer material P2. However, as in another embodiment shown in FIG. 26, the filler polymer material P2 may be filled into the separation spaces 24 without covering the surfaces of the core 16 with the filler polymer material P2. In this case, the filler polymer material P2 filled into the separation spaces 24 may have a thickness substantially the same as the thickness t of the core pieces 22, or the filler polymer material P2 filled into the separation spaces 24 may have a thickness slightly smaller than that of the core pieces 22. Also in this case, when forming the weatherstrip 13, the difference between the thickness of the portions of the trim polymer material P1 covering the core pieces 22 and the connection portions 23 and the thickness of the portions of the trim polymer material P1 covering the separation spaces 24 filled with the filler polymer material P2 can be decreased, so that the difference in mold shrinkage of the trim polymer material P1 in the thickness direction can be decreased. Therefore, recessed marks are prevented from occurring on the surfaces of the weatherstrip 13.

In each of the first to fourth embodiments, a core including core pieces, connection portions, and separation spaces is manufactured in the separation space forming step. However, the separation space forming step can be omitted by obtaining a core including core pieces, connection portions, and separation spaces in advance. Then, the polymer material filling step may be performed. In this case, separation spaces forming means, such as the press machine 29 and the rolling roller machine 91, may be omitted from an apparatus for manufacturing a core.

In each of the first to fourth embodiments, the filler polymer material is filled into the separation spaces during a period that the core having the separation spaces formed therein is substantially plate-shaped. However, the filler polymer material may be filled into the separation spaces after the core having the separation spaces formed therein has been formed in a predetermined cross-sectional shape. Thus, filler polymer material is filled into the separation spaces of the core after the core has been formed (by bending or the like) in a final cross-sectional shape or in an intermediate cross-sectional shape similar to the final cross-sectional shape, so that the filler polymer material is prevented from being displaced or removed from the separation spaces while the core is being formed (by bending, for example).

The method for filling the filler polymer material into the separation spaces of the core may be changed as appropriate. For example, the core pieces, the connection portions, and the separation spaces may be formed in the core material by obtaining a core material to which the filler polymer material in sheet form is continuously layered on at least one of the surfaces of the core material in the longitudinal direction, or by layering filler polymer material in sheet form by performing a layering step so as to continuously layer the filler polymer material in sheet form on at least one of the surfaces of the core material in the longitudinal direction. Subsequently, by applying a compressive force to the filler polymer material in sheet form in the thickness direction, the filler polymer material in sheet form may be flowed from the positions of the core pieces so as to be filled into the separation spaces. Also in this manner, the core to be embedded in the weatherstrip according to the present invention can be easily manufactured.

The filler polymer material may be filled into the separation spaces by immersing the core having the separation spaces formed therein in the filler polymer material in a sol state and then removing excess portions from the core using a doctor knife. Also in this manner, the filler polymer material can be efficiently filled into the separation spaces.

As the core material, a hard thermoplastic synthetic resin plate may be used. A trim with an embedded resin core can be easily recycled after use, because it is not necessary to separate the core from the trim so as to recycle the trim after use. In this case, the core connector 50 (see FIG. 9) such as a thermobonding machine or an adhesive tape bonding machine is used, so that the trailing end and the leading end in the longitudinal direction of the core material are connected and made continuous to each other by thermobonding or using an adhesive bonding tape or the like.

Regarding the core embedded in the weatherstrip of the present invention, it is not necessary that the entire widths of the separation spaces be filled with the filler polymer material. Only a portion of the widths of the separation spaces (for example, a portion of the weatherstrip 13 in FIG. 1 corresponding to the portion visible from the outside) may be filled with the filler polymer material. Thus, the amount of the filler polymer material can be reduced.

The invention claimed is:

1. A core of a trim, the core being made of a long and substantially strip-shaped core material separately preformed with a predetermined thickness equal to or smaller than 1.0 mm, the core comprising a plurality of core pieces and connection portions connecting the plurality of core pieces to each other in a longitudinal direction, the core pieces being disposed at a predetermined interval in the longitudinal direction because separation spaces are formed by press punching a part of the core material at a predetermined interval in the longitudinal direction or because separation spaces are formed by extending, in the longitudinal direction, slits formed at a predetermined interval in the longitudinal direction of the core material, the core being embedded in and integrated with the trim by being covered with a trim polymer material when the trim having a large length is formed, wherein a filler polymer material is filled into the separation spaces and held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, so that, when forming the trim, a difference in mold shrinkage of the trim polymer material in the thickness direction between portions of the trim polymer material covering the core pieces and the connection portions and portions of the trim polymer material covering the separation spaces filled with the filler polymer material is decreased or eliminated, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

2. The core of a trim according to claim 1, wherein the portions to become the connection portions are rolled in the longitudinal direction, the rolled portions are made thinner than portions that are not rolled, the rolled portions are covered with the filler polymer material, and the filler polymer material covering the rolled portions is continuous with the filler polymer material filled into the separation spaces.

3. A method for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the method using a core, the core comprising a plurality of core pieces and connection portions connecting the plurality of core pieces to each other in a longitudinal direction, the core pieces being disposed at a predetermined interval in the longitudinal direction of the core material because separation spaces are formed by press punching a part of the core material at a predetermined interval in the longitudinal direction or because separation spaces are formed by extending, in the longitudinal direction, slits formed at a predetermined interval in the longitudinal direction of the core material, the method comprising:

a polymer material filling step for filling a filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

4. A method for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the method comprising:

a separation space forming step for forming a plurality of core pieces and connection portions connecting the plurality of core pieces to each other in a longitudinal direction, the core pieces being disposed at a predetermined interval in the longitudinal direction by forming separation spaces by press punching a part of the core material at a predetermined interval in the longitudinal direction or by forming separation spaces by extending, in the longitudinal direction, slits formed at a predetermined interval in the longitudinal direction of the core material; and a polymer material filling step for filling filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

5. A method for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the method comprising:

a separation space forming step for forming a plurality of core pieces and connection portions connecting the plurality of core pieces to each other in a longitudinal direction, the core pieces being disposed at a predetermined interval in the longitudinal direction by forming separation spaces by press punching a part of the core material at a predetermined interval in the longitudinal direction or by forming separation spaces by extending, in the longitudinal direction, slits formed at a predetermined interval in the longitudinal direction of the core material; and a polymer material filling step for filling filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, wherein a core material is used, the core material having at least a surface of which the filler polymer material in sheet form is continuously layered in the longitudinal direction, wherein, in the separation space forming step, the core spaces, surfaces of the core pieces and the connection portions are covered with the filler polymer material, and, during a period that the filler polymer material is flowable, the filler polymer material on the surfaces of the core pieces and the connection portions is flowed in the longitudinal and width directions and additionally filled into the separation spaces.

6. A method for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the method comprising:

a separation space forming step for forming a plurality of core pieces and connection portions connecting the plurality of core pieces to each other in a longitudinal direction, the core pieces being disposed at a predetermined interval in the longitudinal direction by forming separation spaces by press punching a part of the core material at a predetermined interval in the longitudinal direction or by forming separation spaces by extending, in the longitudinal direction, slits formed at a predetermined interval in the longitudinal direction of the core material; and a polymer material filling step for filling filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, the method further comprising a layering step for continuously layering the filler polymer material in sheet form on at least a surface of the core material in the longitudinal direction, wherein, in the separation space forming step, the core pieces, the connection portions, and the separation spaces are formed in the core material on which the filler polymer material in sheet form is layered, and wherein, in the polymer material filling step, the filler polymer material in sheet form is flowed from the position of the core pieces and filled into the separation spaces by applying a compressive force in the thickness direction to the filler polymer material in sheet form.

7. The method for manufacturing a core of a trim according to claim 4, wherein, in the polymer material filling step, the filler polymer material is filled into the separation spaces after the core having the separation spaces formed therein has been formed in a predetermined cross-sectional shape.

8. The method for manufacturing a core of a trim according to claim 3, wherein, in the polymer material filling step, when filling the filler polymer material into the separation spaces, surfaces of the core pieces and the connection portions are covered with the filler polymer material, and, during a period that the filler polymer material is flowable, the filler polymer material on the surfaces of the core pieces and the connection portions is flowed in the longitudinal and width directions and additionally filled into the separation spaces.

9. An apparatus for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the apparatus using a core, the core comprising a plurality of core pieces and connection portions connecting the plurality of core pieces to each other in a longitudinal direction, the core pieces being disposed at a predetermined interval in the longitudinal direction of the core material because separation spaces are formed by press punching a part of the core material at a predetermined interval in the longitudinal direction or because separation spaces are formed by extending, in the longitudinal direction, slits formed at a predetermined interval in the longitudinal direction of the core material, the apparatus comprising:

core feeding means for continuously feeding the core having the separation spaces formed therein in the longitudinal direction; and polymer material filling means for filling filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

10. An apparatus for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the apparatus comprising:

core material feeding means for continuously feeding the core material in the longitudinal direction;

separation space forming means for forming a plurality of core pieces and connection portions connecting the plurality of core pieces to each other in a longitudinal direction, the core pieces being disposed at a predetermined interval in the longitudinal direction by forming separation spaces by press punching a part of the core material at a predetermined interval in the longitudinal direction or by forming separation spaces by extending, in the longitudinal direction, slits formed at a predetermined interval in the longitudinal direction of the core material; and polymer material filling means for filling a filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

11. An apparatus for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the apparatus comprising:

core material feeding means for continuously feeding the core material in the longitudinal direction;

separation space forming means for forming a plurality of core pieces and connection portions connecting the plurality of core pieces to each other in a longitudinal direction, the core pieces being disposed at a predetermined interval in the longitudinal direction by forming separation spaces by press punching a part of the core material at a predetermined interval in the longitudinal direction or by forming separation spaces by extending, in the longitudinal direction, slits formed at a predetermined interval in the longitudinal direction of the core material; and polymer material filling means for filling a filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, wherein the separation space forming means is a rolling roller machine that, in a state in which a plurality of slits are formed at a predetermined interval in the longitudinal direction in such a manner that the slits extend in a width direction so as to leave portions of the core material to become the connection portions, rolls and extends the portions to become the connection portions in the longitudinal direction and enlarges the slits in the longitudinal direction.

12. An apparatus for manufacturing a core of a trim, the core being made of a long and substantially strip-shaped core material separately preformed with a predetermined thickness equal to or smaller than 1.0 mm and embedded in and integrated with the trim by being covered with a trim polymer material when the trim having a large length is formed, the apparatus using a core, the core comprising a plurality of core pieces and connection portions connecting the plurality of core pieces to each other in a longitudinal direction, the core pieces being disposed at a predetermined interval in the longitudinal direction of the core material because separation spaces are formed by press punching a part of the core material at a predetermined interval in the longitudinal direction or because separation spaces are formed by extending, in the longitudinal direction, slits formed at a predetermined interval in the longitudinal direction of the core material, the apparatus comprising:

core feeding means for continuously feeding the core having the separation spaces formed therein in the longitudinal direction; and polymer material filling means for filling filler polymer material into the separation spaces in a flowable state so as to make the filler polymer material to be held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, further comprising additional filling means for additionally filling the filler polymer material into the separation spaces after the polymer material filling means has filled the filler polymer material into the separation spaces.

13. A trim having a large length and including a core for reinforcement, the core being made of a long and substantially strip-shaped core material separately preformed with a predetermined thickness equal to or smaller than 1.0 mm, the core comprising a plurality of core pieces and connection portions connecting the plurality of core pieces to each other in a longitudinal direction at least before being embedded in the trim, the core pieces being disposed at a predetermined interval in the longitudinal direction because separation spaces are formed by press punching a part of the core material at a predetermined interval in the longitudinal direction or because separation spaces are formed by extending, in the longitudinal direction, slits formed at a predetermined interval in the longitudinal direction of the core material, the core being embedded in and integrated with the trim by being covered with a trim polymer material, wherein a filler polymer material is filled into the separation spaces and held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, so that the trim polymer material and the polymer filler material are integrally joined to each other at a contact portion and a difference in mold shrinkage of the trim polymer material in the thickness direction between portions of the trim polymer material covering the core pieces and the connection portions and portions of the trim polymer material covering the separation spaces filled with the filler polymer material is decreased or eliminated, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

14. A trim, having a large length and including a core for reinforcement, the core being made of a long and substantially strip-shaped core material separately preformed with a predetermined thickness equal to or smaller than 1.0 mm, the core comprising a plurality of core pieces and connection portions connecting the plurality of core pieces to each other in a longitudinal direction at least before being embedded in the trim, the core pieces being disposed at a predetermined interval in the longitudinal direction because separation spaces are formed by press punching a part of the core material at a predetermined interval in the longitudinal direction or because separation spaces are formed by extending, in the longitudinal direction, slits formed at a predetermined interval in the longitudinal direction of the core material, the core being embedded in and integrated with the trim by being covered with a trim polymer material, wherein a filler polymer material is filled into the separation spaces and held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, so that the trim polymer material and the polymer filler material are integrally joined to each other at a contact portion and a difference in mold shrinkage of the trim polymer material in the thickness direction between portions of the trim polymer material covering the core pieces and the connection portions and portions of the trim polymer material covering the separation spaces filled with the filler polymer material is decreased or eliminated, wherein both the trim polymer material and the filler polymer material are elastic rubber mainly composed of ethylene-propylene-dien rubber and the trim polymer material and the filler polymer material are joined to each other at a contact portion by vulcanized adhesion.

15. A method for manufacturing a trim having a large length, the trim including a core for reinforcement, the core being made of a long and substantially strip-shaped core material separately preformed with a predetermined thickness equal to or smaller than 1.0 mm, the core comprising a plurality of core pieces and connection portions connecting the plurality of core pieces to each other in a longitudinal direction at least before being embedded in the trim, the core pieces being disposed at a predetermined interval in the longitudinal direction because separation spaces are formed by press punching a part of the core material at a predetermined interval in the longitudinal direction or because separation spaces are formed by extending, in the longitudinal direction, slits formed at a predetermined interval in the longitudinal direction, the core being embedded in and integrated with the trim by being covered with a trim polymer material, the method using the core having the separation spaces filled with a filler polymer material and the filler polymer material is held between the adjacent core pieces in a state in which the filler polymer material does not adhere to the core pieces, the filler polymer material being capable of chemically joined to the trim polymer material and having a lower hardness and being more flexible than the core material to such an extent as not to prevent the adjacent core pieces from being moved closer to or away from each other, the method comprising:

an extrusion step for embedding the core in a trim body by covering the core with the trim polymer material by extruding the trim body by continuously supplying the core to an extrusion die for forming the trim body into a predetermined cross-sectional shape and continuously supplying the trim polymer material to the extrusion die in a flowable state; and a treatment step, which is performed after the extrusion step, for curing or solidifying the trim body formed from the trim polymer material, wherein, in the extrusion step and/or the treatment step, the trim polymer material and the filler polymer material are joined and integrated with each other at a contact portion, wherein portions of the filler polymer material filled into the separation spaces are connected each other, wherein the entire surface of the core pieces and the connection portions are covered with the filler polymer material, and the filler polymer material covering the core pieces and the connection portions has a thickness that does not exceed the thicknesses of the core pieces and the connection portions and is continuous with the filler polymer material filled into the separation spaces.

* * * * *